(12) United States Patent
He et al.

(10) Patent No.: US 12,319,114 B2
(45) Date of Patent: Jun. 3, 2025

(54) HEATING, VENTILATION, AND AIR CONDITIONING CASE WITH EXTRACTOR PORT TO AMBIENT

(71) Applicant: Rivian IP Holdings, LLC, Plymouth, MI (US)

(72) Inventors: Jing He, Novi, MI (US); Jamie W. Leadbetter, Woking (GB); Henry Huang, Ann Arbor, MI (US); Armando Mendez Abrego, Sunnyvale, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/388,888

(22) Filed: Jul. 29, 2021

(65) Prior Publication Data

US 2023/0031346 A1 Feb. 2, 2023

(51) Int. Cl.
*B60H 1/00* (2006.01)

(52) U.S. Cl.
CPC ..... *B60H 1/00028* (2013.01); *B60H 1/00278* (2013.01); *B60H 1/00842* (2013.01); *B60H 2001/00107* (2013.01)

(58) Field of Classification Search
CPC ............ B60H 1/00028; B60H 1/00278; B60H 1/00842; B60H 2001/00107; B60H 2001/00092; B60H 2001/00178; B60H 1/0005; B60H 1/00521; B60H 1/00457; B60H 1/00535; B60H 1/3204; B60H 1/00685; B60H 1/00835; B60H 1/08; B60H 1/2225
See application file for complete search history.

(56) References Cited

U.S. PATENT DOCUMENTS

| | | | | |
|---|---|---|---|---|
| 2,264,848 A | * | 12/1941 | Kahl | B60H 1/00007 62/243 |
| 2,796,820 A | * | 6/1957 | Moore | B60H 1/242 454/159 |
| 3,173,275 A | * | 3/1965 | Urian | B60L 1/02 62/412 |

(Continued)

FOREIGN PATENT DOCUMENTS

| | | |
|---|---|---|
| CN | 101386285 A | 3/2009 |
| CN | 103629741 A | 3/2014 |

(Continued)

OTHER PUBLICATIONS

Office Action on EP Appl. No. 22152927.4 dated Mar. 22, 2024.

(Continued)

*Primary Examiner* — Ljiljana V. Ciric
(74) *Attorney, Agent, or Firm* — Foley & Lardner LLP

(57) ABSTRACT

A heating, ventilation, and air conditioning (HVAC) includes a case, an ambient inlet port defined in the case and configured to selectively receive air from outside the cabin of a vehicle, a recirculation inlet port defined in the case and configured to selectively receive air from inside the cabin of the vehicle, at least one discharge port configured to selectively discharge at least a portion of an airflow from the case to inside the cabin of the vehicle, and an extractor port disposed within the case and configured to discharge at least a portion of the airflow from the case to the ambient environment.

4 Claims, 21 Drawing Sheets

(56) References Cited

U.S. PATENT DOCUMENTS

| | | | | |
|---|---|---|---|---|
| 3,595,029 | A * | 7/1971 | Lende, Jr. | B60H 1/00207 62/507 |
| 3,646,875 | A * | 3/1972 | Zenkner | B60H 1/00042 454/160 |
| 3,719,135 | A * | 3/1973 | Breitschwerdt | B60H 1/00028 454/158 |
| 3,752,223 | A * | 8/1973 | Finch | B60H 1/3407 454/324 |
| 3,834,451 | A * | 9/1974 | Kozinski | F28D 1/0443 165/43 |
| 3,973,620 | A * | 8/1976 | Stringer | B60H 1/00 62/244 |
| 4,307,575 | A * | 12/1981 | Frosch | F25B 27/007 62/235.1 |
| 4,628,702 | A * | 12/1986 | Boxum | B60H 1/00364 62/411 |
| 4,672,818 | A * | 6/1987 | Roth | B60H 1/00535 62/298 |
| 4,696,225 | A * | 9/1987 | Weller | B60H 3/0633 55/303 |
| 4,722,265 | A * | 2/1988 | Koukal | B60H 1/28 454/147 |
| 4,779,517 | A * | 10/1988 | Weller | B60H 1/00028 454/146 |
| 5,031,712 | A * | 7/1991 | Karolek | B60R 16/04 180/68.5 |
| 5,341,652 | A * | 8/1994 | Tajiri | B60H 1/00907 62/244 |
| 5,490,572 | A * | 2/1996 | Tajiri | B60L 1/02 180/68.5 |
| 5,524,446 | A * | 6/1996 | Hotta | B60H 1/00814 62/179 |
| 5,730,237 | A * | 3/1998 | Matsuki | H01M 10/615 180/68.5 |
| 5,735,338 | A * | 4/1998 | Chevroulet | B60H 1/0005 219/202 |
| 6,005,481 | A * | 12/1999 | Takagi | B60R 16/0231 340/622 |
| 6,059,016 | A * | 5/2000 | Rafalovich | F28D 20/02 165/41 |
| 6,206,775 | B1 * | 3/2001 | Lemaitre | B60H 1/008 454/75 |
| 6,220,383 | B1 * | 4/2001 | Muraki | H01M 10/6563 180/68.5 |
| 6,758,739 | B1 * | 7/2004 | Sangwan | B60H 3/0085 454/75 |
| 7,240,752 | B2 * | 7/2007 | Takahashi | B60R 16/04 454/143 |
| 7,290,630 | B2 * | 11/2007 | Maeda | F28F 1/128 180/69.2 |
| 7,451,608 | B2 * | 11/2008 | Kikuchi | B60L 7/14 62/186 |
| 7,900,727 | B2 * | 3/2011 | Shinmura | H01M 10/625 180/68.1 |
| 8,251,169 | B2 * | 8/2012 | Fujiwara | H01M 10/6565 180/68.5 |
| 8,276,696 | B2 * | 10/2012 | Lucas | B60K 1/04 180/68.5 |
| 8,863,871 | B2 * | 10/2014 | Kobayashi | H01M 8/0662 180/68.2 |
| 8,960,346 | B2 * | 2/2015 | Ogawa | B60K 11/06 180/68.1 |
| 9,188,052 | B2 * | 11/2015 | Tajima | F01P 5/06 |
| 9,252,621 | B2 * | 2/2016 | Miyano | H01M 10/63 |
| 9,566,859 | B2 * | 2/2017 | Hatta | B60L 50/64 |
| 9,649,912 | B2 * | 5/2017 | Loup | B60H 3/0633 |
| 9,994,087 | B2 * | 6/2018 | Enomoto | B60H 1/22 |
| 10,449,826 | B2 * | 10/2019 | Schumann | H01M 10/663 |
| 10,603,978 | B2 * | 3/2020 | Sawyer | B60H 1/00564 |
| 10,647,173 | B2 * | 5/2020 | Ghannam | B60H 1/00835 |
| 10,759,252 | B2 * | 9/2020 | Lee | B60L 1/02 |
| 10,870,368 | B2 * | 12/2020 | Ing | B60L 58/26 |
| 10,875,379 | B2 * | 12/2020 | Agathocleous | F24F 11/30 |
| 11,161,390 | B2 * | 11/2021 | Sakane | B60H 1/00849 |
| 2010/0326127 | A1 * | 12/2010 | Oomura | B60H 1/3208 62/498 |
| 2013/0227973 | A1 * | 9/2013 | Kang | B60H 1/00921 62/140 |
| 2013/0333406 | A1 * | 12/2013 | Takahashi | F25B 41/39 62/238.7 |
| 2015/0380785 | A1 * | 12/2015 | Takeuchi | B60L 1/02 429/62 |
| 2017/0087956 | A1 * | 3/2017 | Graaf | B60H 1/00921 |
| 2019/0366794 | A1 * | 12/2019 | Agathocleous | B60H 1/00028 |
| 2023/0031077 | A1 * | 2/2023 | He | F24F 1/032 |
| 2023/0031346 | A1 * | 2/2023 | He | B60H 1/00842 |

FOREIGN PATENT DOCUMENTS

| | | | | |
|---|---|---|---|---|
| CN | 103796853 | A | | 5/2014 |
| CN | 207360030 | U | | 5/2018 |
| CN | 104972865 | B | * | 6/2020 ......... B60H 1/00057 |
| CN | 210941265 | U | | 7/2020 |
| DE | 3520413 | A1 | * | 12/1986 |
| DE | 102008046744 | A1 | * | 4/2009 ......... B60H 1/00278 |
| DE | 102014104969 | B4 | * | 11/2019 ......... B60H 1/00057 |
| DE | 102017115190 | B4 | * | 7/2022 ......... B60H 1/00392 |
| FR | 2582999 | A1 | * | 12/1986 |
| FR | 2848500 | A1 | * | 6/2004 .......... B60H 3/0633 |
| FR | 3049238 | A1 | | 9/2017 |
| JP | H0773906 | A | * | 3/1995 |
| JP | 2002-352867 | A | | 12/2002 |
| JP | 2010-013044 | A | | 1/2010 |
| JP | 2013-091367 | A | | 5/2013 |
| KR | 10-2019-0136930 | | | 12/2019 |
| KR | 20190136930 | A | * | 12/2019 |
| KR | 10-2020-0025794 | | | 3/2020 |
| WO | WO-2013/105201 | A1 | | 7/2013 |
| WO | WO-2016/134082 | A1 | | 8/2016 |

OTHER PUBLICATIONS

Extended European Search Report on EP Appl. No. 22152927.4 dated Jul. 15, 2022.

Office Action on CN Application No. 202210104217.1 dated Feb. 27, 2025, with machine translation.

Office Action on KR Application No. 10-2022-0012004 dated Mar. 27, 2025, with machine translation.

* cited by examiner

HEATING, VENTILATION, AND AIR CONDITIONING CASE WITH EXTRACTOR PORT TO AMBIENT

INTRODUCTION

The present disclosure relates to heating, ventilation, and air conditioning cases. The statements in this section merely provide background information related to the present disclosure and may not constitute prior art.

Heat pumps may experience degraded performance in cold weather (such as, for example, below −10° C.) due to little-to-no heat from ambient air, reduced refrigerant mass flow rate (because low temperature results in low suction pressure for a compressor which results in low refrigerant density), and operational constraints on the compressor at low temperatures. Moreover, in vehicles such as electric vehicles, an extremely high load (such as, for example, 15 KW or more) may possibly be encountered during evolutions such as, for example, direct current (DC) fast charging (DCFC) or uphill towing. Such a large load may entail that currently-known refrigerant systems be sized well above standard, currently-known configurations.

BRIEF SUMMARY

Various disclosed embodiments include illustrative heating, ventilation, and air conditioning (HVAC) devices, HVAC systems, vehicles, and methods.

In an illustrative embodiment, a heating, ventilation, and air conditioning (HVAC) device includes a case, an ambient inlet port defined in the case and configured to receive air from ambient air external to a structure, a recirculation inlet port defined in the case and configured to receive air from the structure, at least one discharge port configured to discharge at least a portion of the air from the case to the structure, and an ambient extractor port defined in the case and configured to discharge from the case to an ambient environment exterior to the structure the air provided to the ambient extractor port.

In another illustrative embodiment, an HVAC system includes a case, a blower disposed in the case and configured to cause air to flow, a first heat exchanger disposed in the case and configured to heat the air, and an ambient extractor port defined in the case and configured to discharge from the case to an ambient environment exterior to a structure the air provided to the ambient extractor port.

In another illustrative embodiment, a vehicle includes a frame, a plurality of rotatable wheels, a battery, at least one drive unit including at least one electric motor electrically couplable to the battery, the at least one drive unit being configured to rotate the wheels, a cabin, and an HVAC system. The HVAC system includes a case, a blower disposed in the case and configured to heat the air, and an extractor port disposed within the case and configured to discharge the air from the case to an ambient environment exterior to the cabin via the ambient extractor port.

In another illustrative embodiment, a method includes causing air to flow in a heating, ventilation, and air conditioning (HVAC) case, heating the air, and discharging at least a portion of the air from the case to an ambient environment exterior to a structure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1A:
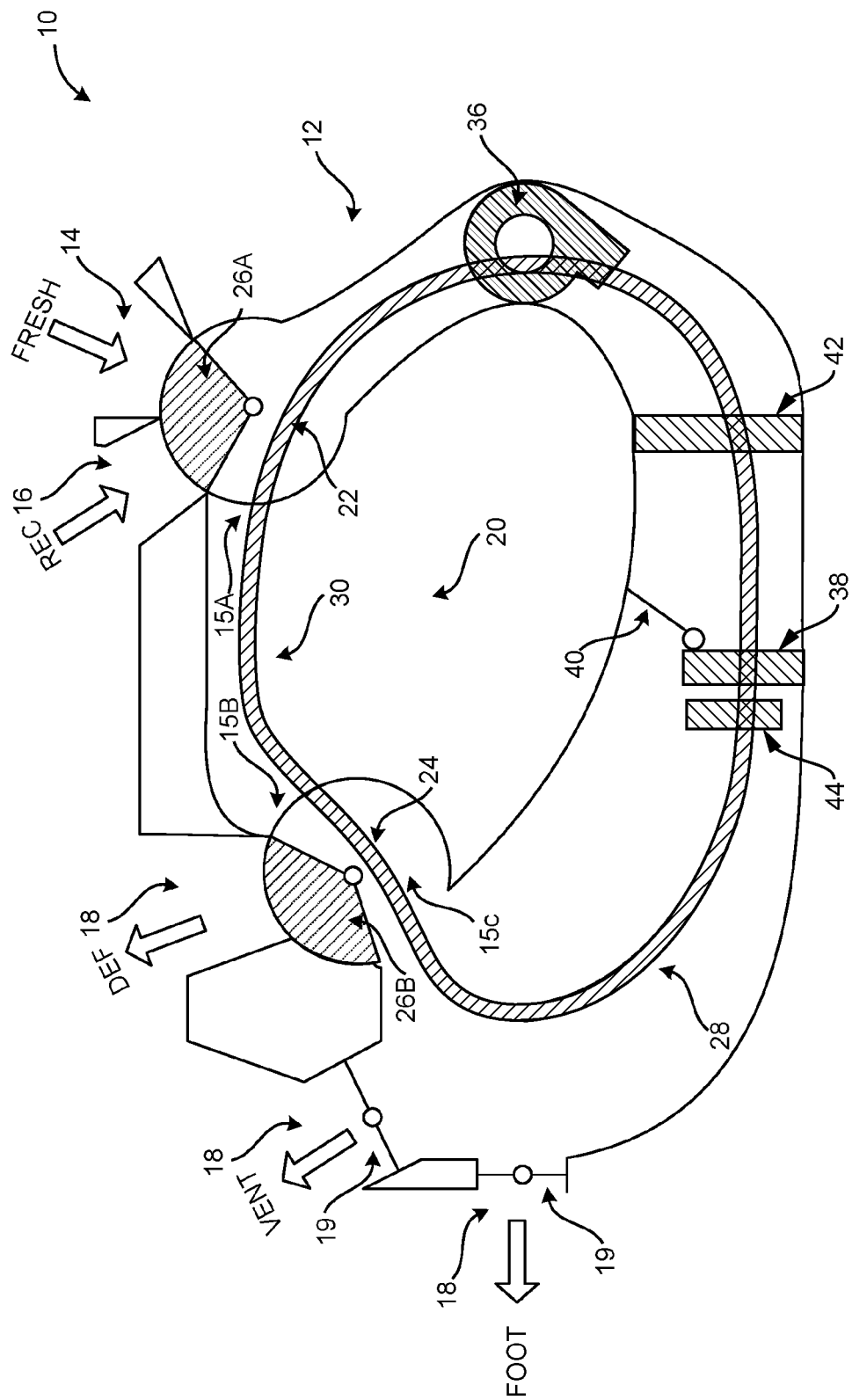
FIG. 1A is a schematic illustration of an illustrative heating, ventilation, and air conditioning (HVAC) case with a multi-position door for case recirculation in a full-case recirculation mode.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Given by way of overview, various disclosed embodiments include illustrative heating, ventilation, and air conditioning (HVAC) devices, HVAC systems, vehicles, and methods. In some embodiments, an illustrative HVAC case includes a multi-position door for case recirculation. It will be appreciated that such embodiments can help provide for more rapid heating of air (especially in cold temperatures, where there may be little-to-no heat from ambient air). In some other embodiments, an illustrative HVAC case includes an ambient extractor port. In some such embodiments, a condenser in the HVAC case can reject excessive heat to an ambient environment, thereby helping a condenser exterior to a structure and a heat exchanger exterior to the structure to provide increased cooling to a heat load exterior to the structure beyond that cooling achievable with only the condenser exterior to the structure. In some other embodiments, an illustrative HVAC case may include a multi-position door for case recirculation and an ambient extractor port.

Now that a non-limiting overview has been given, details of various embodiments will be set forth below by way of non-limiting examples provided by way of illustration only and not of limitation.

Figure 1B:
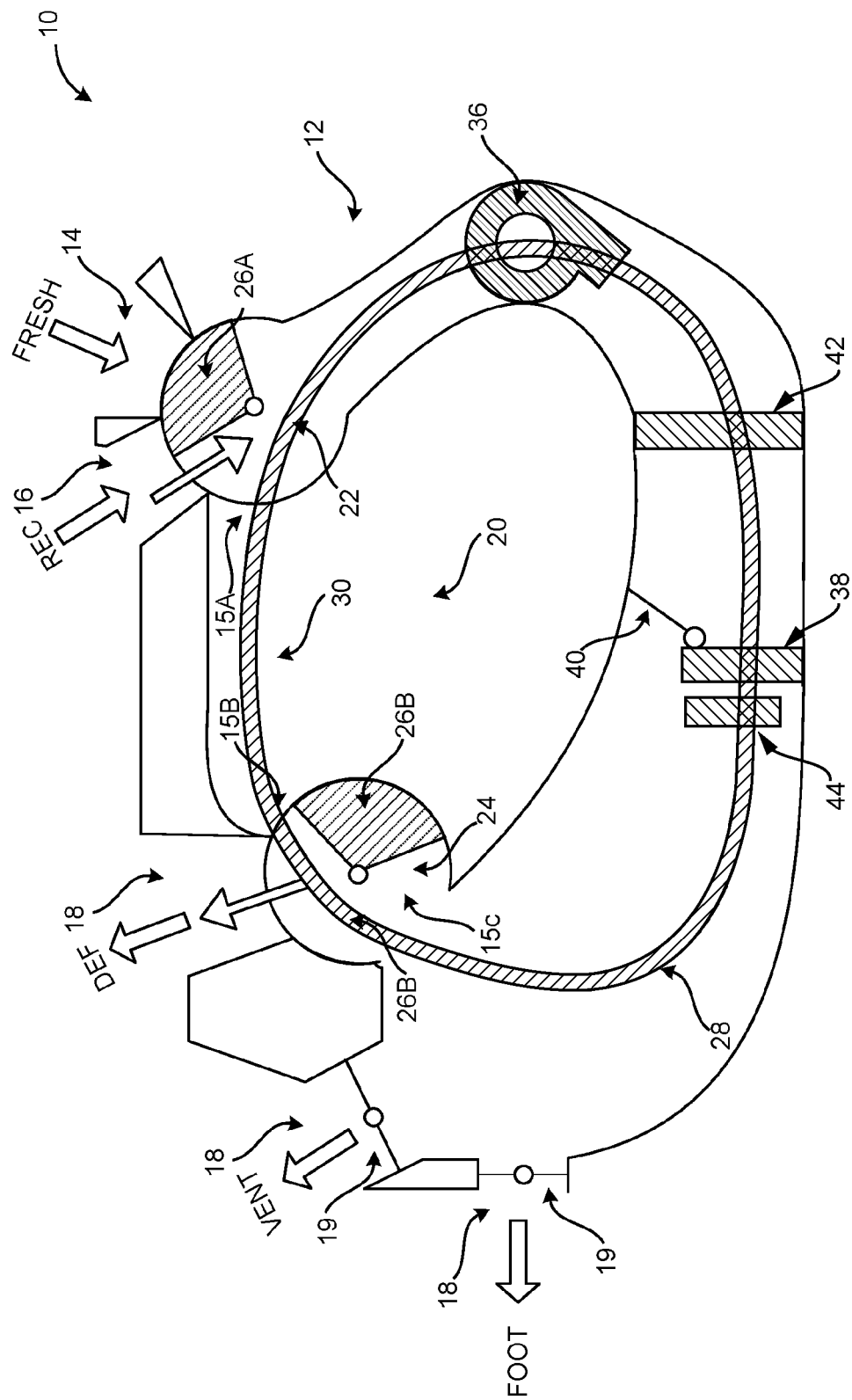
FIG. 1B is a schematic illustration of the HVAC case of FIG. 1A in a partial case recirculation mode.
Figure 1C:
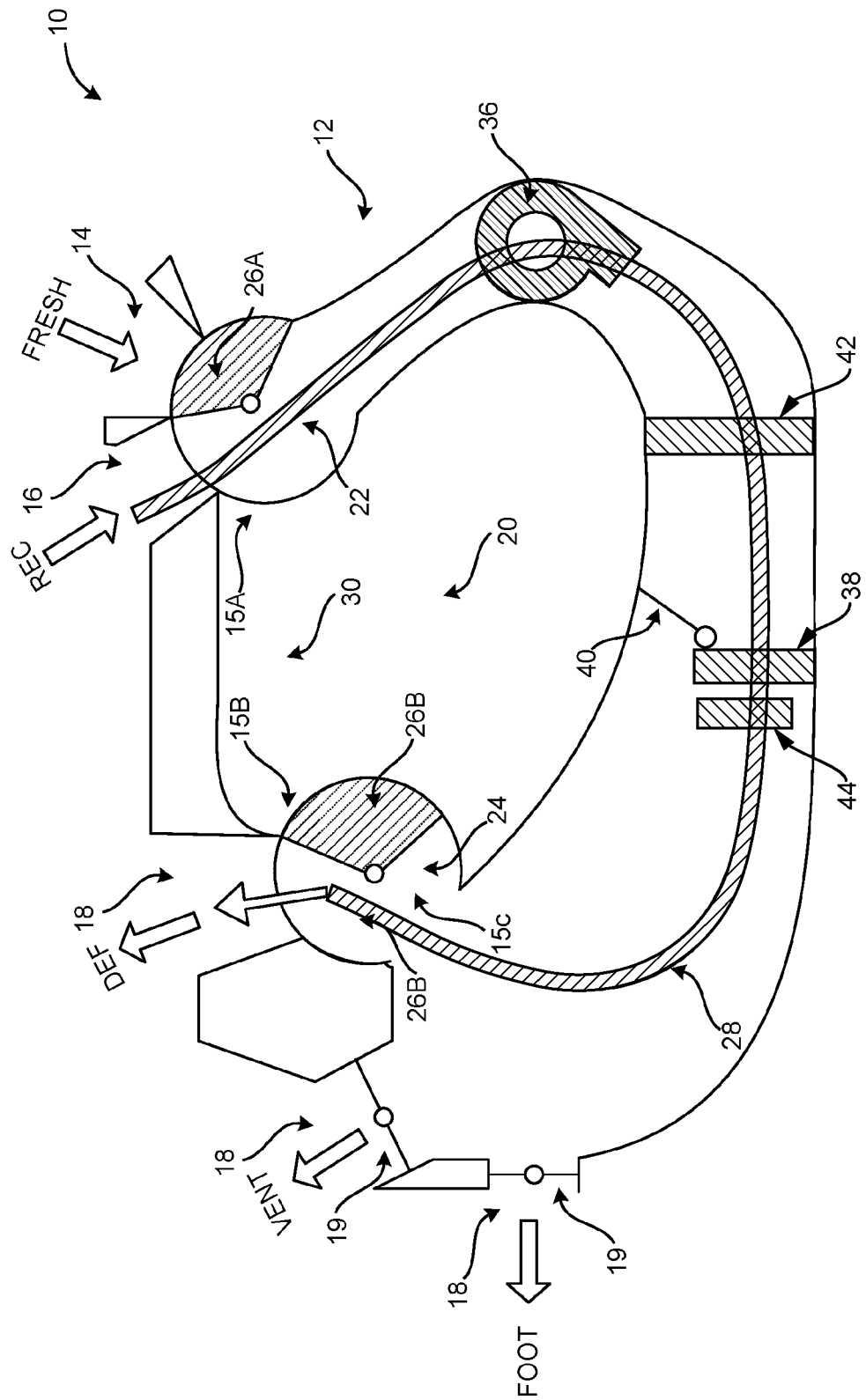
FIG. 1C is a schematic illustration of the HVAC case of FIG. 1A in a cabin recirculation mode.

Referring now to FIGS. 1A-1C, in various embodiments an illustrative device such as an HVAC case 10 includes a case 12, an ambient (fresh) inlet port 14 defined in the case 12 and configured to receive air from ambient air external to a structure (such as, without limitation, a passenger cabin of a vehicle but not shown in FIG. 1A), a recirculation inlet port 16 defined in the case 12 and configured to receive air from the structure, and at least one discharge port 18 configured to discharge at least a portion of air from the case 12 to the structure.

In various embodiments the HVAC case 10 also includes a case inlet port 15C defined in the case 12 and configured to receive air from the case 12, a case discharge port 15B defined in the case 12 and configured to receive air from the case inlet port 15C, a case return port 15A defined in the case 12 and configured to receive air from the case discharge port 15B.

In various embodiments a multi-position air door 20 is disposed in the case 12. The multi-position air door 20 includes an outlet port door section 22 repositionable to engage the case inlet port 15C and the case outlet port 15B such that at least a portion of air from the case inlet port 15C is dischargeable from the case outlet port 15B into a portion 30 of a duct 28 in the case 12. The multi-position air door 20 also includes an inlet port door section 24 repositionable to engage the case return port 15A such that at least a portion of the air from the case discharge port 15B is recirculatable to the case inlet port 15C. That is, at least a portion of the air is recirculatable within the duct 28 in the case 12.

As will be explained below, such embodiments can help provide for more rapid heating of air (especially in cold temperatures, where there may be little-to-no heat from ambient). Structural and airflow control components of the HVAC case 10 will be discussed first, followed by heat transfer system components of higher-level systems.

In various embodiments the inlet port door section 22 includes a sealing member 26A and the outlet port door section 24 includes a sealing member 26B. In various embodiments the sealing member 26A is suitably sized and shaped to engage at least one port chosen from the ambient inlet port 14, the case return port 15A, and the recirculation inlet port 16. For example, the inlet port door section 22 is positionable such that the sealing member 26A seals (e.g., fully sealingly engages) the ambient inlet port 14 and the recirculation inlet port 16 simultaneously, hence blocking the ambient inlet port 14 and the recirculation inlet port 16 and allowing air to flow from the case return port 15A only, as shown in FIG. 1A. The inlet port door section 22 is also positionable such that the sealing member 26A fully seals (e.g., fully sealingly engages) the ambient inlet port 14 but only partially seals (e.g., partially sealingly engages) the recirculation inlet port 16 (FIG. 1B) or does not seal (e.g., does not sealingly engage) the recirculation inlet port 16 at all (FIG. 1C), hence allowing air to flow from both the case return port 15A and the recirculation inlet port 16. The inlet port door section 22 may be positionable such that the sealing member 26A fully seals (e.g., fully sealingly engages) the case return port 15A but only partially seals (e.g., partially sealingly engages) the recirculation inlet port 16 (from zero percent blockage to full blockage), hence adjusting proportion of airflow from the ambient inlet port 14 and the recirculation inlet port 16. The inlet port door section 22 may also be positionable such that the sealing member 26A only partially seals (e.g., partially sealingly engages) the ambient inlet port 14 (from zero percent blockage to full blockage).

In various embodiments the sealing member 26B is suitably sized and shaped to engage at least one port chosen from its associated discharge port 18 (such as a "defrost" discharge port 18), the case inlet port 15C, and the case discharge port 15B. For example, the outlet port door section 24 is positionable such that the sealing member 26B fully seals (e.g., fully sealingly engages) its associated discharge port 18 and allows all air entering the case inlet port 15C to be discharged via the case discharge port 15B into the portion 30 and return to the case return port 15A via the duct 28, as shown in FIG. 1A.

It will be appreciated that the configuration shown in FIG. 1A permits full-case recirculation within the HVAC case 10. In such embodiments, the outlet port door section 24 is repositionable to fully seal (e.g., fully sealingly engage) its associated discharge port 18 such that the air is not dischargeable from the case 12. The inlet port door section 22 is positioned such that the sealing member 26A fully seals (e.g., fully sealingly engages) the ambient inlet port 14 and the recirculation inlet port 16 simultaneously. The outlet port door section 24 is positioned such that the sealing member 26B fully seals (e.g., fully sealingly engages) its associated discharge port 18 and allows all air entering the case inlet port 15C to be discharged via the case discharge port 15B into the portion 30 and return to the case return port 15A. Thus, air does not enter the case 12 via the ambient inlet port 14 or the recirculation inlet port 16 and does not exit the case 12 via any of the discharge ports 18. Therefore, air fully recirculates in the duct 28. As will be explained below, such recirculation within the case 12 helps facilitate rapid heating of air.

As another example, the outlet port door section 24 is also positionable such that the sealing member 26B does not seal (e.g., not sealingly engage) its associated discharge port 18 and permits a portion of the air entering the case inlet port 15C to be discharged from both its associated discharge port 18 and the case discharge port 15B. The portion of air discharged into the portion 30 via the case discharge port 15B then returns to the case return port 15A, as shown in FIG. 1B.

It will be appreciated that the configuration shown in FIG. 1B permits partial-case recirculation within the HVAC case 10. In such embodiments, the outlet port door section 24 is repositionable to open (e.g., not fully sealingly engage) the at least one discharge port 18 (such as the "defrost" discharge port 18) such that a portion of the air is dischargeable from the case 12 to the structure and another portion of the air is recirculatable in the case 12. The inlet port door section 22 is positioned such that the sealing member 26A sealingly engages the ambient inlet port 14 and a portion of the recirculation inlet port 16 simultaneously. As such, air can be received through a portion of the recirculation inlet port 16. The outlet port door section 24 is positioned such that the sealing member 26B does not fully sealingly engage its associated discharge port 18 and permits a portion of the air entering the case inlet port 15C to be discharged via the case discharge port 15B into the portion 30 and return to the case return port 15A. Thus, a portion of air enters the case 12 via the recirculation inlet port 16, another portion of air exits the case 12 via the discharge port 18 associated with the outlet port door section 24, and another portion of air is discharged via the case discharge port 15B into the portion 30, returns to the case return port 15A, and recirculates in the duct 28 to the case inlet port 15C.

As another example and as shown in FIG. 1C, the HVAC case 10 is configured for full-cabin recirculation. For example, the outlet port door section 24 is also positionable such that the sealing member 26B fully seals (e.g., fully sealingly engages) the case discharge port 15B and causes all air entering the case inlet port 15C to be discharged via the associated discharge port 18 (FIG. 1C). Thus, no air is discharged from the case discharge port 15B to the portion 30. The outlet port door section 24 may also be positionable such that the sealing member 26B fully seals (e.g., fully sealingly engages) the case inlet port 15C and only permits air flowing in the duct 28 to be discharged from other discharge ports 18, such as a "vent" discharge port 18 or a "foot" discharge port 18. These other discharge ports 18 not associated with the outlet port door section 24 are openable (FIG. 1D) and closeable (FIGS. 1A-1C) via an associated air door 19. The inlet port door section 22 is positionable such that the sealing member 26A sealingly engages the ambient inlet port 14 and a portion of the recirculation inlet port 16 simultaneously. As such, air can be received through a portion of the recirculation inlet port 16. Thus, air enters the case 12 via the recirculation inlet port 16, circulates in the duct 28, and exits the case 12 via the discharge port 18 associated with the outlet port door section 24 (without recirculating via the portion 30 and the case return port 15A). It will be appreciated that this configuration entails no recirculation within the case 12.

Figure 1D:
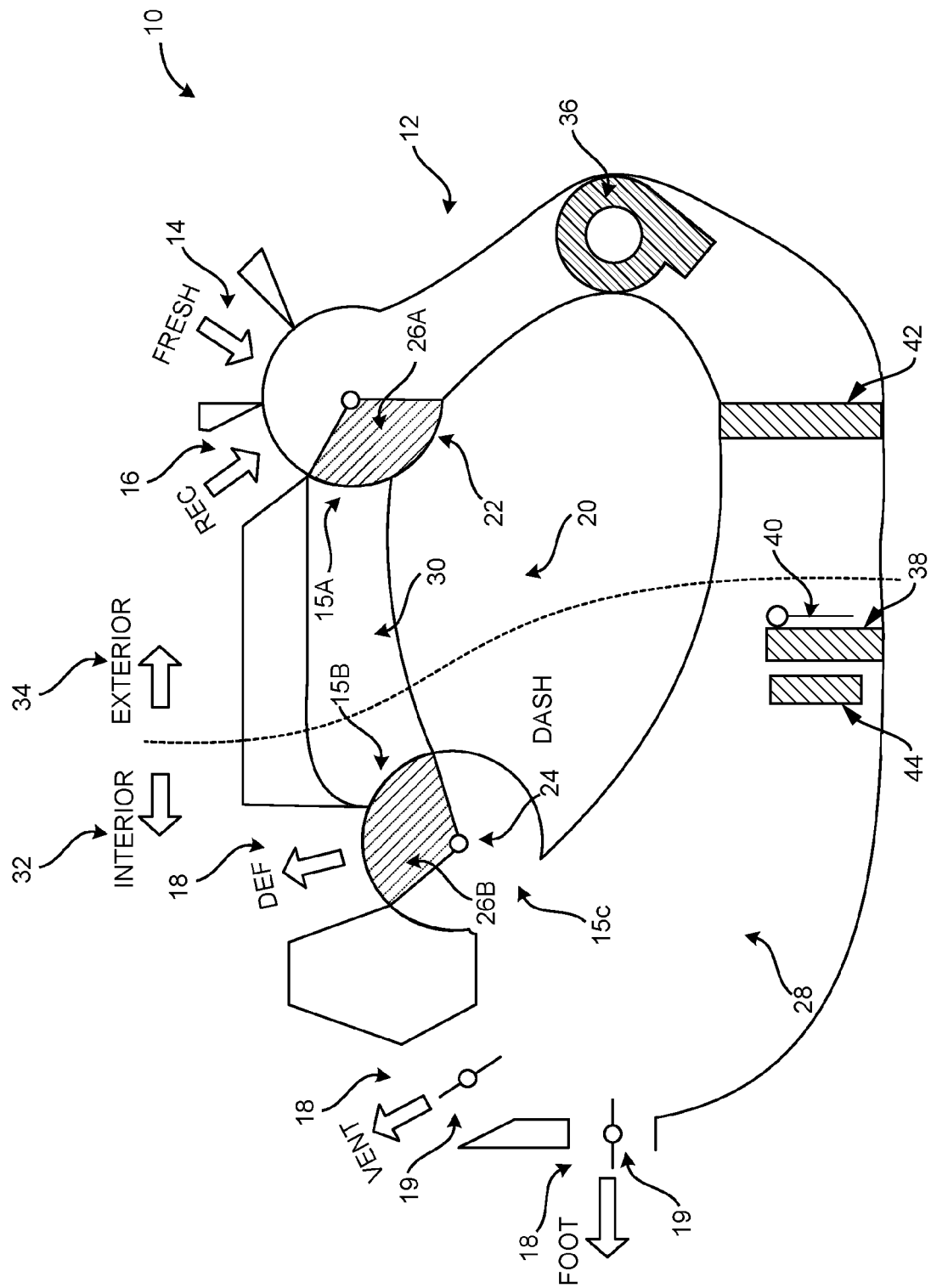
FIG. 1D is a schematic illustration of the HVAC case of FIG. 1A installable partly within an interior of a structure and partly exterior to the structure.

Referring additionally to FIG. 1D, in various embodiments the HVAC case 10 may be configured to be disposed entirely in a structure or disposed partially in the structure and partially exterior to the structure. For example and without limitation, a portion 32 of the case 12 may be disposed in an interior of a structure and a portion 34 of the case 12 may be disposed exterior to the structure. In such embodiments, it will be appreciated that less space in the structure may be used than in embodiments in which the entirety of the HVAC case 10 is disposed in the structure. As mentioned above, in various embodiments and given by way of non-limiting example, the structure may include a passenger cabin of a vehicle. In such embodiments, the portion 32 may be disposed in the passenger cabin and the portion 34 may be disposed exterior to the passenger cabin and in a portion of the vehicle such as a powertrain compartment, an engine compartment, or the like. After HVAC components have been discussed below, location of such heat transfer components relative to a structure will be discussed.

Figure 1E:
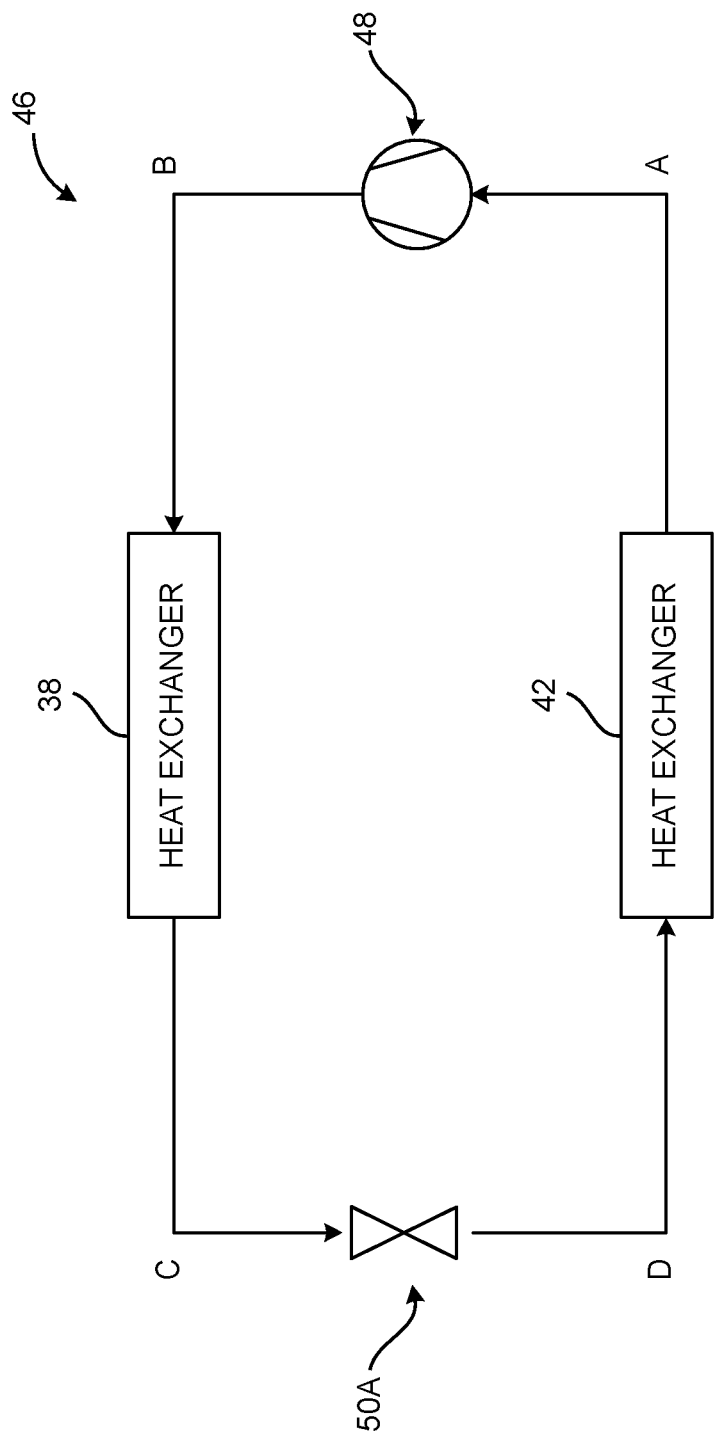
FIG. 1E is a block diagram in partial schematic form of an illustrative heat pump circuit for use with the HVAC case of FIG. 1A.
Figure 1F:
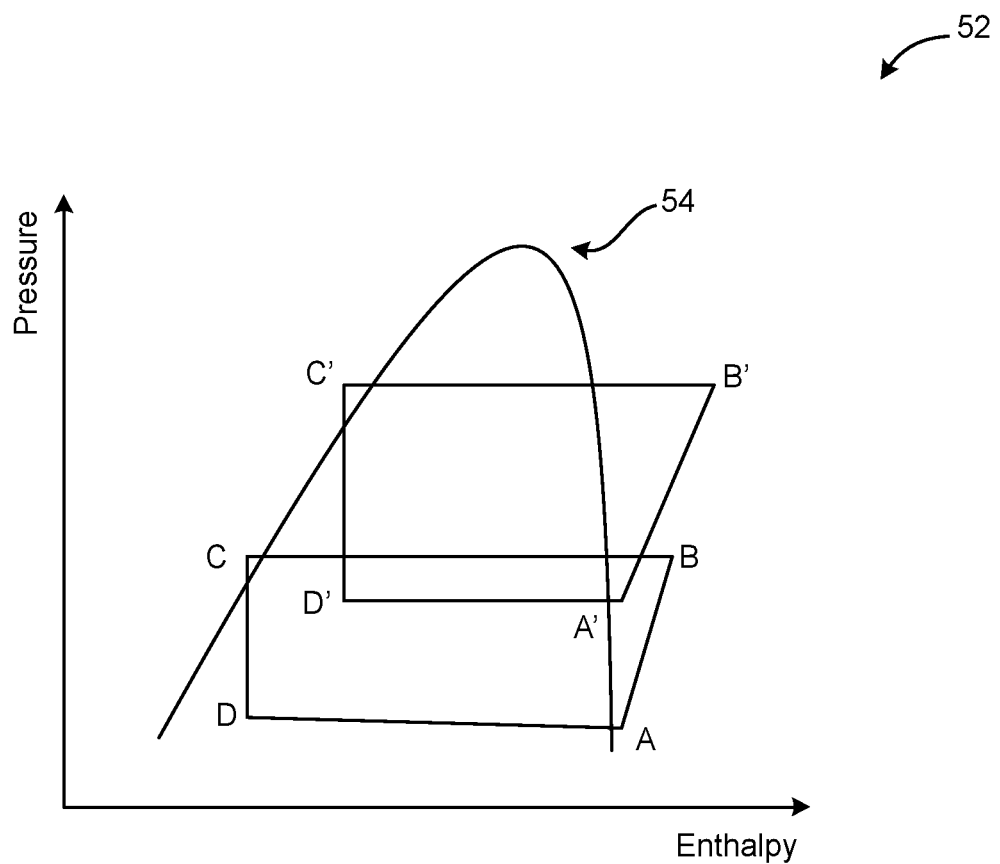
FIG. 1F is a graph of pressure versus enthalpy for the heat pump circuit of FIG. 1E.

Referring additionally to FIGS. 1E and 1F, in various embodiments the HVAC case 10 includes various HVAC components and, as a result, suitably is a self-contained HVAC system contained within the case 12. In various embodiments the HVAC system suitably is implemented as a heat pump system. For sake of brevity, a heat pump cycle is discussed below by way of non-limiting example. However, it will be appreciated that any type of heating and air conditioning cycles may be used as desired for a particular application.

In various embodiments and as shown in FIGS. 1A-1C, the case 12 is configured to at least partially recirculate air in the case 12 as discussed above. In various embodiments a blower 36 is disposed in the case 12 and is configured to cause air to flow. The blower 36 is any suitable blower. For example, in various embodiments the blower 36 may include brushed or brushless motors.

In various embodiments a first heat exchanger 38 is disposed in the case 12 and is configured to heat the air. The heat exchanger 38 is configured to exchange heat between the air and refrigerant flowable in the heat exchanger 38. In various embodiments the heat exchanger 38 suitably is implemented as a condenser. The heat exchanger 38 may include any design suitable for exchanging heat between the air and the refrigerant. For example, the heat exchanger 38 suitably may include single-zone or dual-zone temperature control feature on the structure.

In various embodiments a temperature door 40 may be disposed in the case 12 adjacent the heat exchanger 38. As shown in FIGS. 1A-1C, the temperature door 40 may be positioned in a "full hot" mode to force air to flow through the heat exchanger 38 and not bypass the heat exchanger 38, thereby maximizing the amount of heat exchanged between the air and the refrigerant in the heat exchanger 38. As shown in FIG. 1D, the temperature door 40 may be positioned in a "full cold" mode to permit air to bypass the heat exchanger 38 instead of flowing through the heat exchanger 38, thereby minimizing the amount of heat exchanged between the air and the refrigerant in the heat exchanger 38. It will be appreciated that the temperature door 40 may be positioned intermediate the position shown in FIGS. 1A-1C ("full hot" mode) and the position shown in FIG. 1D ("full cold" mode) to select an amount of heat to be exchanged between the air and the heat exchanger 38 as desired for a particular application (that is, a "blend" mode).

In various embodiments a second heat exchanger 42 is disposed in the case 12 and is configured to exchange heat with air at least partially recirculated within the case 12 from the heat exchanger 38. The heat exchanger 42 is configured to exchange heat between the air and refrigerant flowable in the heat exchanger 42. In various embodiments the heat exchanger 38 suitably is implemented as an evaporator. The heat exchanger 42 may example, the heat exchanger 42 suitably may include two-pass or four-pass counterflow design.

As shown in FIGS. 1A-1D, in various embodiments the HVAC case 10 may further include a heating element 44 disposed in the case 12 and configured to heat the air in the case 12. In various embodiments the heating element 44 may include any suitable heating element, such as without limitation an electric heating element like a positive temperature coefficient (PTC) electric heater, or the like.

In various embodiments and as shown in FIG. 1E, a refrigerant circuit 46 includes a compressor 48, the heat exchanger 38, an expansion device 50A, and the heat exchanger 42. In such embodiments the refrigerant circuit 46 implements a vapor-compression cycle, such as without limitation a heat pump refrigeration cycle.

In various embodiments the compressor 48 is configured to receive refrigerant from the heat exchanger 42, compress the refrigerant, and provide compressed high-temperature, high-pressure refrigerant to the heat exchanger 38. The compressor 48 suitably is any acceptable compressor as desired for a particular application, such as without limitation an electric scroll compressor, a mechanical belt-driven piston compressor, or the like.

In various embodiments the expansion device 50A is configured to receive refrigerant from the heat exchanger 38, expand the refrigerant, and provide expanded low-temperature, low-pressure refrigerant to the second heat exchanger 42. The expansion device 50A suitably is any acceptable expansion device as desired for a particular application, such as without limitation an electronic expansion valve, a thermal expansion valve, an orifice, or the like.

In various embodiments the refrigerant may include any suitable refrigerant as desired for a particular application. For example and given by way of non-limiting examples, in various embodiments the refrigerant may include a synthetic refrigerant like R134a or R1234yf or a natural refrigerant like R744 (carbon dioxide).

In various embodiments and as shown in FIG. 1F with continued reference to FIGS. 1A-1E, the refrigerant circuit 46 implements a suitable vapor-compression cycle, such as without limitation a heat pump cycle. A graph 52 plots pressure versus enthalpy for the vapor-compression cycle.

At a state point A, low-temperature, low-pressure refrigerant, in pure vapor or predominately vapor, is supplied to a suction inlet of the compressor 48. The compressor 48 compresses the low-temperature, low-pressure refrigerant into high-temperature, high pressure refrigerant vapor (state point B) and discharges the high-temperature, high pressure refrigerant vapor into the heat exchanger 38. The high-temperature, high-pressure refrigerant vapor rejects heat to the air in the case 12, thereby heating the air, and condenses into intermediate-temperature, high-pressure refrigerant (state point C). The intermediate-temperature, high-pressure refrigerant is then expanded in the expansion device 50A into low-temperature, low-pressure refrigerant as a liquid-vapor mixture (state point D). The liquid-vapor mixture D flows into the heat exchanger 42 where it absorbs heat from the air in the case 12 and evaporates into low-temperature, low pressure refrigerant as pure vapor or predominately vapor (state point A) to complete the vapor-compression cycle.

The net effect of the vapor-compression cycle in FIG. 1F is heated air due to the compressor power output, shown as enthalpy increase from A to B. The air can be further heated when the heating element 44 is turned on. The heated air, when flowing through the heat exchanger 42, results in elevated pressure and density of refrigerant to the suction inlet of the compressor 48. Therefore, the refrigerant mass flow increases—which demands higher compressor power output and, in turn, yields further heated air. As the process continues, the vapor-compressor cycle moves towards higher and higher pressure regions (from A-B-C-D to A'-B'-C'-D' in FIG. 1F) and heating capacity of the refrigerant circuit 46 keeps increasing. Thus, in various embodiments the HVAC case 10 and the HVAC system disposed therein can help contribute to providing for more rapid heating of air (especially in cold temperatures, where there may be little-to-no heat from ambient).

Figure 1G:
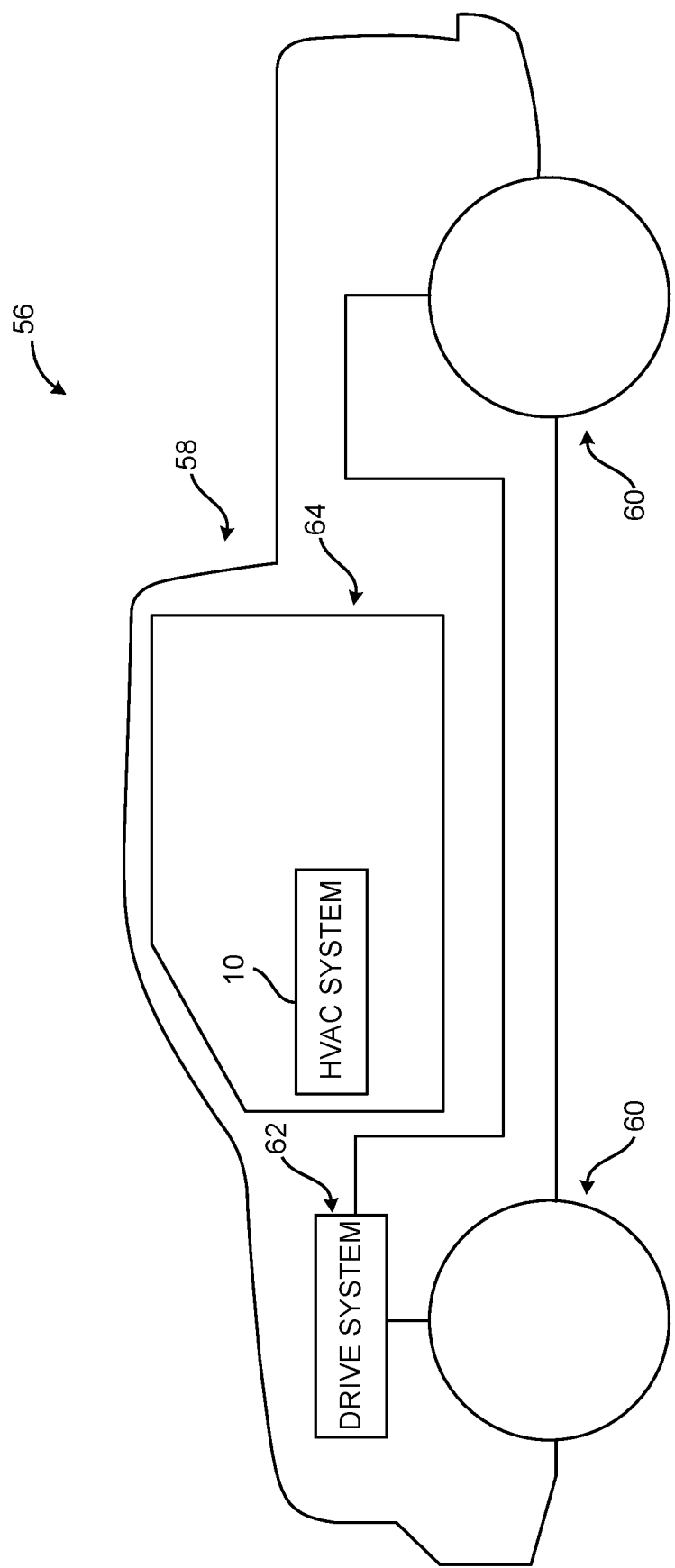
FIG. 1G is a block diagram in partial schematic form of an illustrative vehicle with the HVAC case of FIG. 1.

In various embodiments and referring additionally to FIG. 1G, an illustrative vehicle 56 may include an HVAC system (such as that provided by the HVAC case 10). In various embodiments the vehicle 56 includes a frame 58, rotatable wheels 60, a drive system 62 (such as an internal combustion engine, a hybrid drive system, or an electric motor) configured to rotate the wheels 60, and a cabin 64. The vehicle 56 includes a heating, ventilation, and air conditioning (HVAC) system as described above.

In various embodiments, the HVAC system is provided as the HVAC case 10 that includes the case 12 at least partially disposed in the cabin 64 and configured to at least partially recirculate air flowing in the case 12, the blower 36 disposed in the case 12 and configured to cause air to flow, the heat exchanger 38 disposed in the case 12 and configured to heat the air within the case 12, and the heat exchanger 42 disposed in the case 12 and configured to exchange heat with the air within the case 12.

Figure 1H:
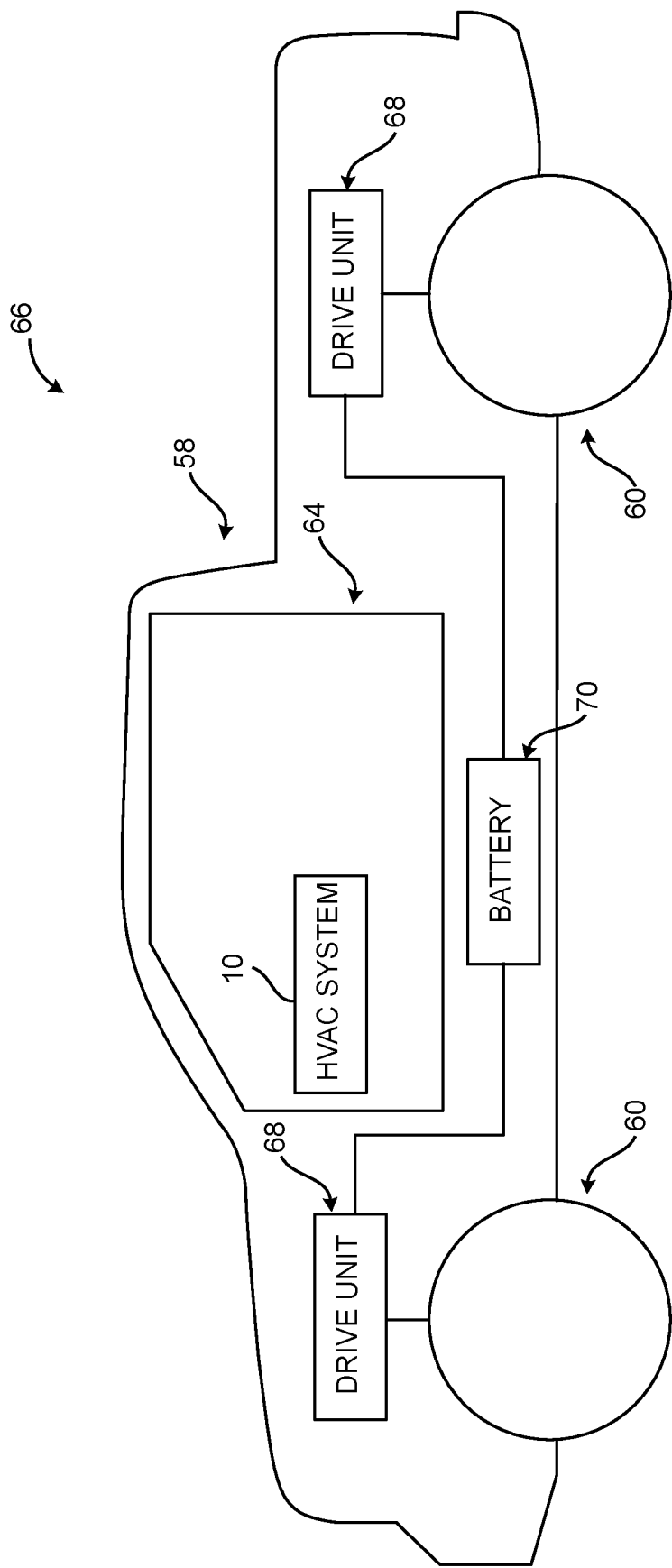
FIG. 1H is a block diagram in partial schematic form of another illustrative vehicle with the HVAC case of FIG. 1A.

In various embodiments and referring additionally to FIG. 1H, an illustrative electric vehicle 66 may include an HVAC system (such as that provided by the HVAC case 10). In various embodiments the vehicle 66 includes the frame 58, the rotatable wheels 60, at least one drive unit 68 electrically couplable to a battery 70 (each drive unit 68 including at least one electric motor) configured to rotate the wheels 60, and the cabin 64. The vehicle 66 includes a heating, ventilation, and air conditioning (HVAC) system as described above. In various embodiments, the HVAC system is provided as the HVAC case 10 that includes the case 12 at least partially disposed in the cabin 64 and configured to at least partially recirculate air in the case 12, the blower 36 disposed in the case 12 and configured to cause air to flow, the heat exchanger 38 disposed in the case 12 and configured to heat the air within the case 12, and the heat exchanger 42 disposed in the case 12 and configured to exchange heat with the air within the case 12.

In various embodiments, the HVAC case 10 is configured to be disposed in a manner chosen from disposed entirely in the cabin 64 of the vehicle 56 or 66 and disposed partially in the cabin 64 of the vehicle 56 or 66 and partially exterior to the cabin 64 of the vehicle 56 or 66. For example, in some embodiments the heat exchanger 38 and the heating element 44 may be disposed in the cabin 64 and the heat exchanger 42 and the blower 36 may be disposed exterior to the cabin 64. It will be appreciated that such a mounting scheme saves space inside the cabin 64. It will also be appreciated that locating the blower 36 outside the cabin can help reduce noise, vibration, and harshness (NVH) issues, thereby helping to contribute to a quieter and smoother experience for an occupant.

Figure 1I:
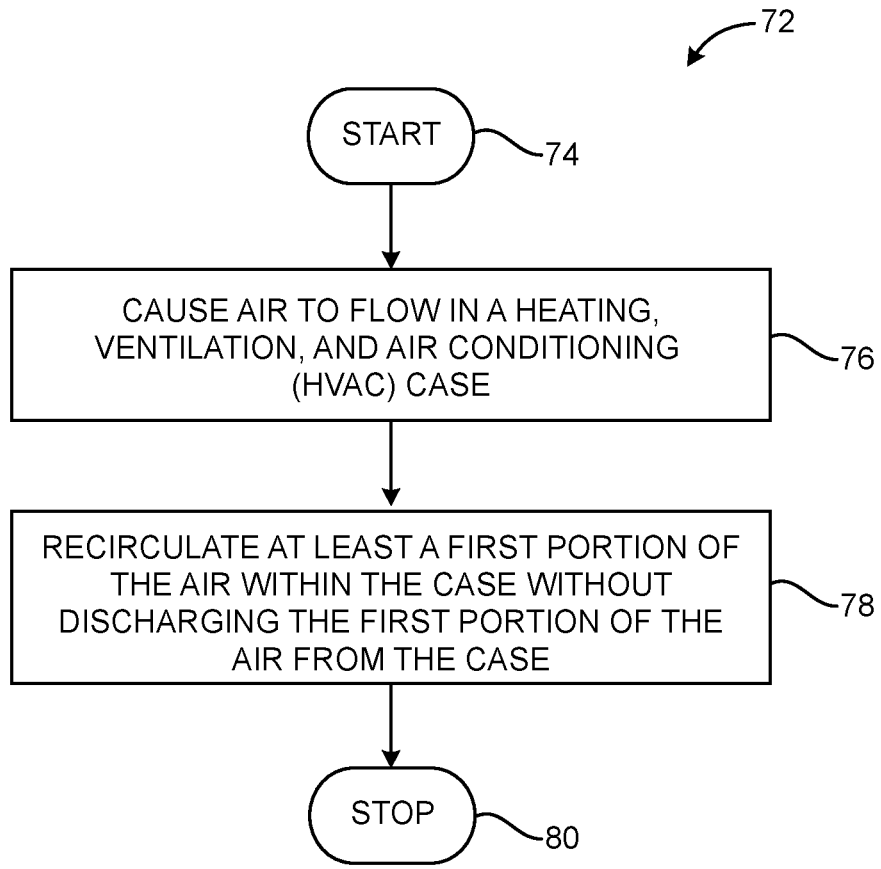
FIG. 1I is a flowchart of a method for recirculating air within an HVAC case.

Referring additionally to FIG. 1I, an illustrative method 72 is provided for recirculating air in an HVAC case. The method 72 begins at a block 74. At a block 76 air is caused to flow in a heating, ventilation, and air conditioning (HVAC) case. At a block 78 at least a first portion of the air is recirculated within the case without discharging the first portion of the air from the case. The method 72 ends at a block 80.

In various embodiments recirculating at least a first portion of the air within the case without discharging the first portion of the air from the case may include recirculating all the air flowing within the case without discharging any of the air from the case.

In various embodiments a second portion of the air may be discharged from the case into a structure, and air may be received from the structure into the case.

In various embodiments the air may be discharged from the case into the structure and air may be received from the structure into the case.

In various embodiments suction pressure of a compressor in a refrigerant circuit associated with the case may be boosted.

In various embodiments the air flowing in the case may be heated with a first heat exchanger disposed in the case and air at least partially recirculated within the case may be presented from the first heat exchanger to a second heat exchanger disposed in the case.

In various embodiments heat may be exchanged between the air at least partially recirculated within the case from the first heat exchanger and refrigerant in the second heat exchanger.

In various embodiments refrigerant may be provided from the second heat exchanger to the compressor and the refrigerant provided from the second heat exchanger may be compressed.

In various embodiments, the air in the case may be heated with at least one heating element.

Figure 2A:
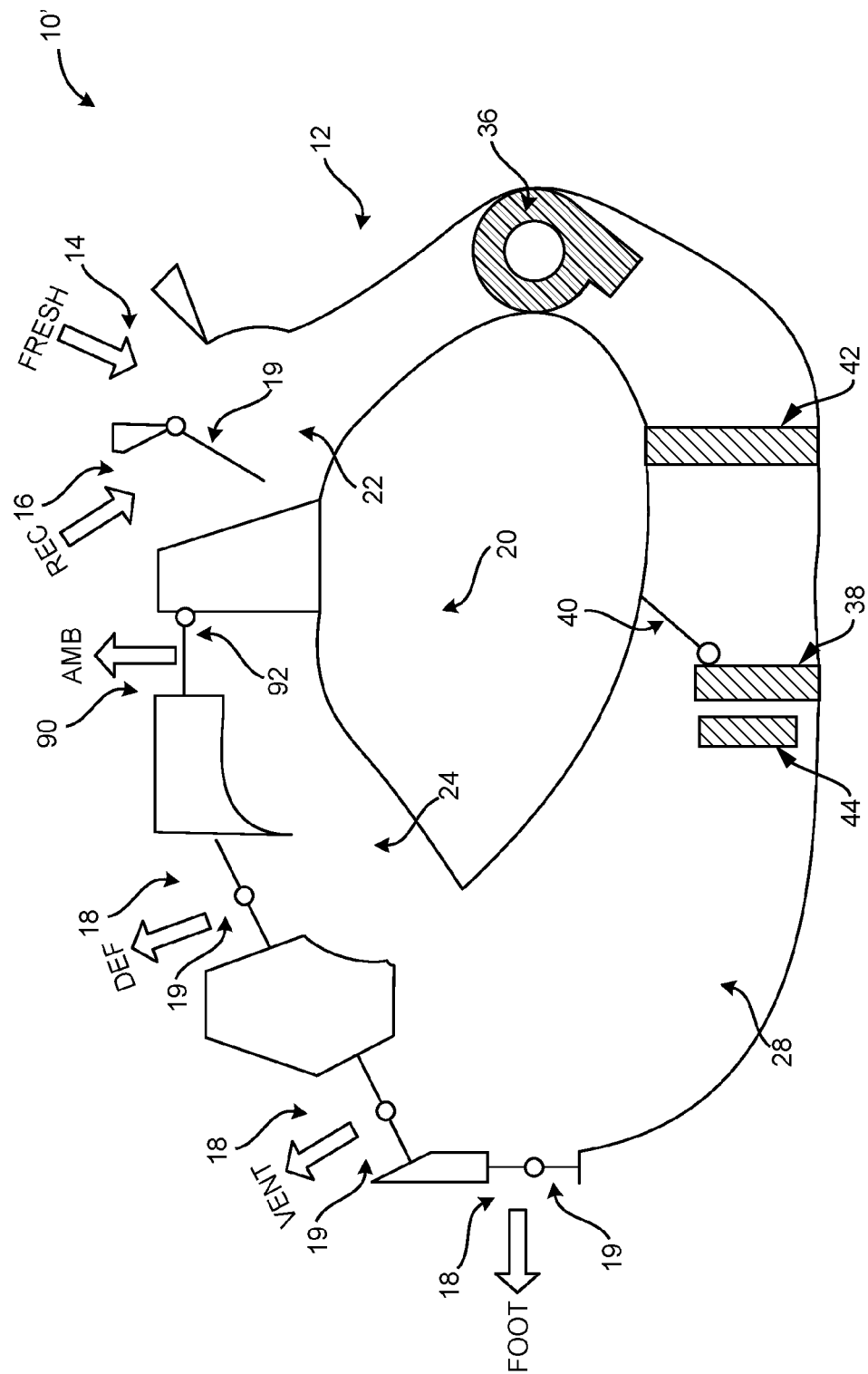
FIG. 2A is a schematic illustration of an illustrative HVAC case with an ambient extractor port.
Figure 2B:
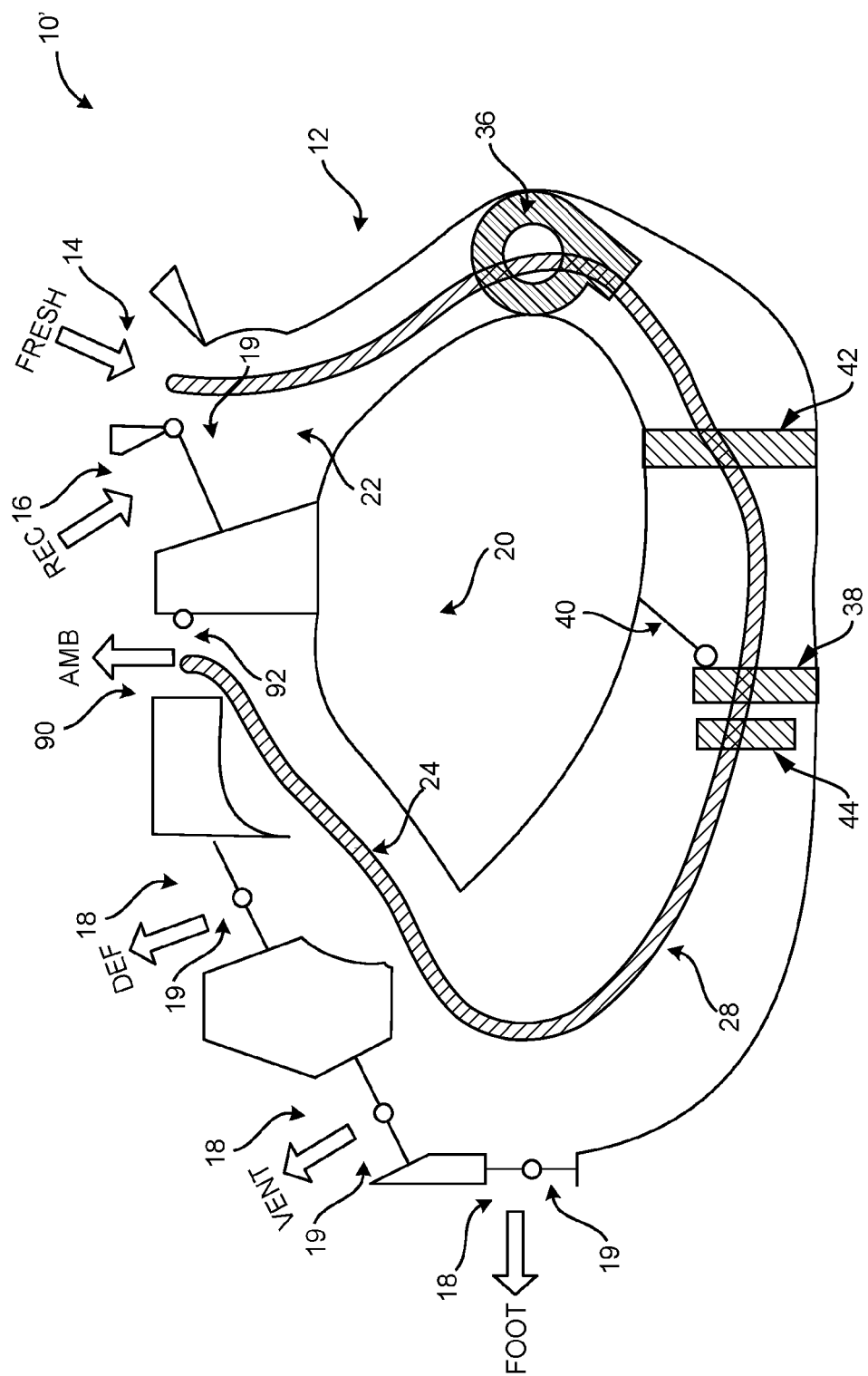
FIG. 2B is a schematic illustration of the HVAC case of FIG. 2A configured to discharge air to an ambient environment.

Referring additionally to FIGS. 2A-2B, in various embodiments an HVAC case 10' includes a case 12', the ambient inlet port 14 (fresh), the recirculation inlet port 16, and at least one discharge port 18. An ambient extractor port 90 is disposed within the case 12' and is configured to discharge from the case 12' to an ambient environment exterior to a structure the air provided to the ambient extractor port 90. That is, the air provided to the ambient extractor port 90 is discharged from the case 12' to the ambient environment exterior to the structure—and is not discharged by the ambient extractor port 90 from the case 12' to the structure. While, in some applications, some of the air may be discharged to the structure by one or more of the discharge ports, if desired, the air provided to the ambient extractor port 90 is discharged from the case 12' to the ambient environment exterior to the structure—and is not discharged by the ambient extractor port 90 from the case 12' to the structure. Thus, in various embodiments at least a portion of the air is discharged from the case 12' to an ambient environment exterior to a structure.

As will be explained below, in some such embodiments a condenser in the case 12' can reject excessive heat to ambient air exterior to the structure, thereby assisting a condenser exterior to the structure and a heat exchanger exterior to the structure to provide increased cooling to a heat load exterior to the structure beyond that cooling achievable with only the condenser exterior to the structure.

For sake of brevity, details of components of the HVAC 10' case in common with components of the HVAC case 10 will not be repeated.

In various embodiments the ambient extractor port 90 includes an air door 92 repositionable between a first position configured to permit discharge of the air from the case 12' to an ambient environment exterior to the structure (FIG. 2B) and a second position configured to prevent discharge of the air from the case 12' to the ambient environment exterior to the structure (FIG. 2A).

It will be appreciated that the HVAC case 10' does not include the multi-position air door 20 (FIGS. 1A-1D). To that end, in various embodiments the ambient inlet port 14, the recirculation inlet port 16, and all the discharge ports 18 are openable and closeable via an associated air door 19.

Figure 2C:
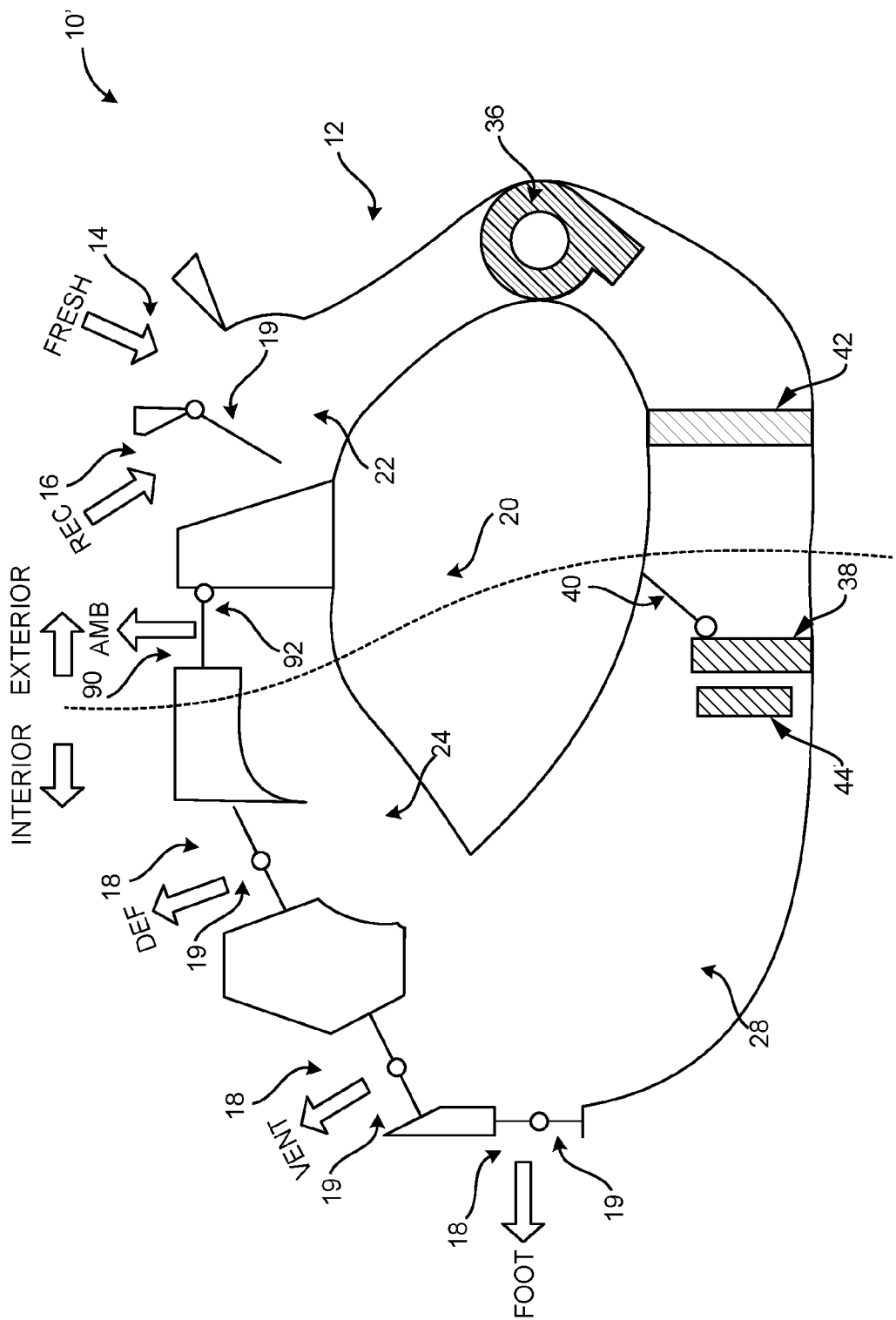
FIG. 2C is a schematic illustration of the HVAC case of FIG. 2A installable partly within an interior of a structure and partly exterior to the structure.

Referring additionally to FIG. 2C, it will also be appreciated that in various embodiments the HVAC case 10' may be configured to be disposed entirely in a structure or disposed partially in the structure and partially exterior to the structure in the same manner as the HVAC case 10 (FIG. 1D).

Figure 2D:
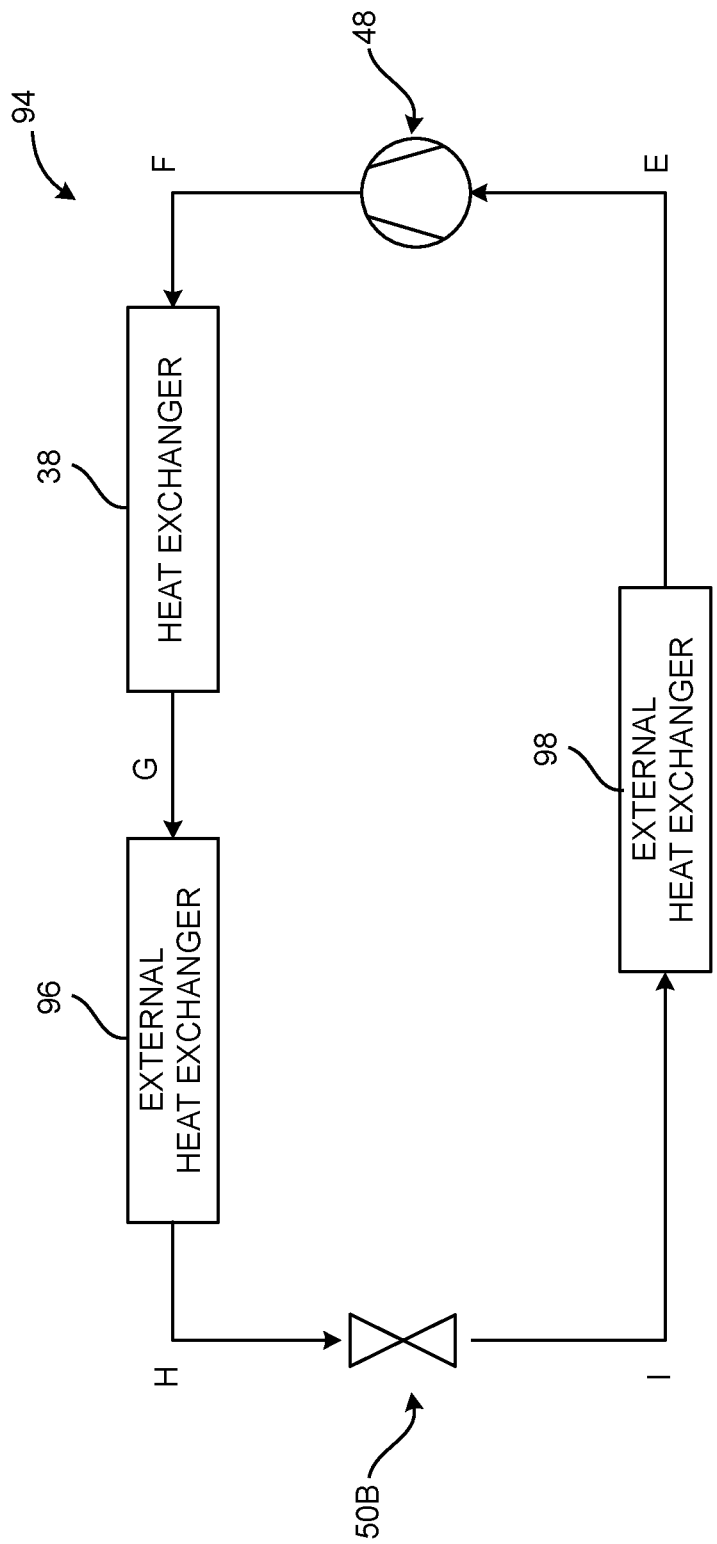
FIG. 2D is a block diagram in partial schematic form of an illustrative heat pump circuit for use with the HVAC case of FIG. 2A.
Figure 2E:
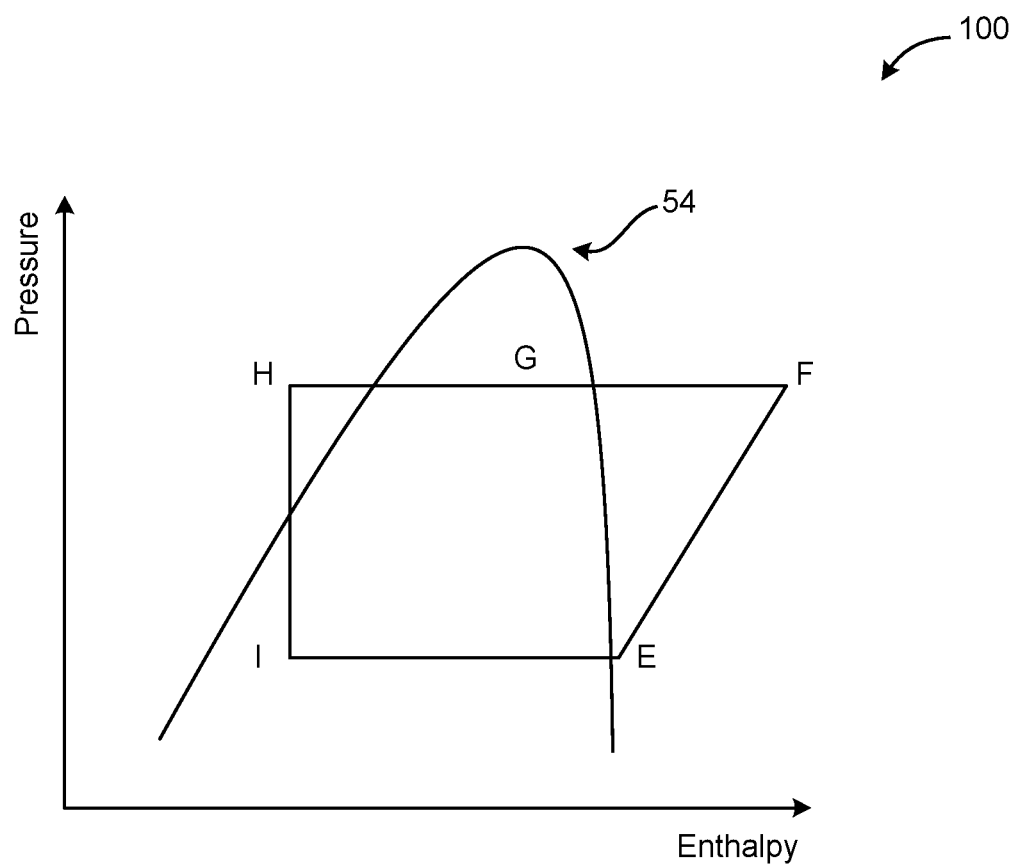
FIG. 2E is a graph of pressure versus enthalpy for the heat pump circuit of FIG. 2D.

Referring additionally to FIGS. 2D and 2E, in various embodiments the HVAC case 10' includes various HVAC components and, as a result, suitably is a self-contained HVAC system contained within the case 12'. In various embodiments the HVAC system suitably is implemented in a heat pump system. For sake of brevity, a heat pump cycle is discussed below by way of non-limiting example. However, it will be appreciated that any type of heating and air conditioning cycles may be used as desired for a particular application.

In various embodiments and as shown in FIGS. 2A-2B, the blower 36 is disposed in the case 12' and is configured to cause air to flow as discussed above. As also shown in FIGS. 2A and 2B, in various embodiments the heat exchanger 38 is disposed in the case 12' and is configured to heat the air as discussed above. As shown in FIGS. 2A and 2B, the ambient extractor port 90 is disposed within the case 12' and is configured to discharge from the case 12' to an ambient environment exterior to a structure the air provided to the ambient extractor port 90.

In various embodiments and as shown in FIG. 2D, a refrigerant circuit 94 includes the compressor 48, the heat exchanger 38, an external heat exchanger 96, an expansion device 50B, and a third heat exchanger 98. In such embodiments the refrigerant circuit 46 implements a vapor-compression cycle, such as without limitation a heat pump cycle.

The compressor 48, the heat exchanger 38, and the refrigerant have been discussed above. The expansion device 50B is similar to the expansion device 50A (FIG. 1E) discussed above but is sized appropriately for use in the refrigerant circuit 94. For sake of brevity their details are not repeated.

In various embodiments the external heat exchanger 96 is disposed exterior to the structure and is configurable to receive the refrigerant from the heat exchanger 38 and to exchange heat between the refrigerant and ambient air. Given by way of non-limiting example, the external heat exchanger 96 may be a condenser disposed exterior to a cabin of an electric vehicle as part of a front-end cooling module and used in a refrigerant circuit configured to cool a battery of the electric vehicle.

In various embodiments the expansion device 50B is couplable to receive the refrigerant from the external heat exchanger 96 and is configured to expand the refrigerant.

In various embodiments the external heat exchanger 98 is disposed exterior to the structure and is configured to exchange heat between the expanded refrigerant and fluid disposed exterior to the structure. Given by way of non-limiting example, the external heat exchanger 98 may be a chiller disposed exterior to a cabin of an electric vehicle and used in a refrigerant circuit configured to cool coolant fluid used to cool a battery of the electric vehicle.

In various embodiments the compressor 48 is coupled to receive refrigerant from the external heat exchanger 98 and is configured to compress the refrigerant and provide compressed refrigerant to the heat exchanger 38.

In various embodiments and as shown in FIG. 2E with continued reference to FIGS. 2A-2D, the refrigerant circuit 94 implements a suitable vapor-compression cycle, such as without limitation a heat pump cycle. A graph 100 plots pressure versus enthalpy for the vapor-compression cycle.

At a state point E, low-temperature, low-pressure refrigerant, in pure vapor or predominately vapor, is supplied to a suction inlet of the compressor 48. The compressor 48 compresses the low-temperature, low-pressure refrigerant into high-temperature, high pressure refrigerant vapor (state point F) and discharges the high-temperature, high pressure refrigerant vapor into the heat exchanger 38. The high-temperature, high-pressure refrigerant vapor rejects heat to the air in the case 12' and condenses into high-pressure refrigerant at lower temperature (state point G). The high-pressure refrigerant at the state point G enters the external heat exchanger 96, further rejects heat to the ambient environment external to the structure, and condenses into intermediate-temperature, high-pressure refrigerant (state point H). The intermediate-temperature, high-pressure refrigerant is then expanded in the expansion device 50B into low-temperature, low-pressure refrigerant as a liquid-vapor mixture (state point I). The liquid-vapor mixture flows into the external heat exchanger 98 where it absorbs heat from the fluid disposed exterior to the structure and evaporates into low-temperature, low pressure refrigerant as pure vapor or predominately vapor (state point E) to complete the vapor-compression cycle. The coolant fluid disposed exterior to the structure, such as, for example, a water glycol mixture coolant, is then cooled and supplied to the battery for cooling.

It will be appreciated that, in various embodiments, rejecting heat to air in the case 12' with the heat exchanger 38 and then rejecting heat to ambient air with the external heat exchanger 96 creates the heat-rejection capability of the equivalent of a two-stage condenser. It will be appreciated that, in various embodiments, the external heat exchanger 96 may be sized at a maximum size due to space constraints. In such embodiments, it will be appreciated that the combined heat-rejection capability of the heat exchanger 38 and the external heat exchanger 96 may be greater than that of any single heat exchanger that may fit in the location of the external heat exchanger 96. It will also be appreciated that the combined heat-rejection capability of the heat exchanger 38 and the external heat exchanger 96 can, in turn, enable the external heat exchanger 98 to provide additional cooling to its ultimate heat load (such as, for example, a battery of an electric vehicle). Such additional cooling capacity may be desirable during evolutions that can result in increased battery heating, such as without limitation towing uphill or during direct current fast charging.

Figure 2F:
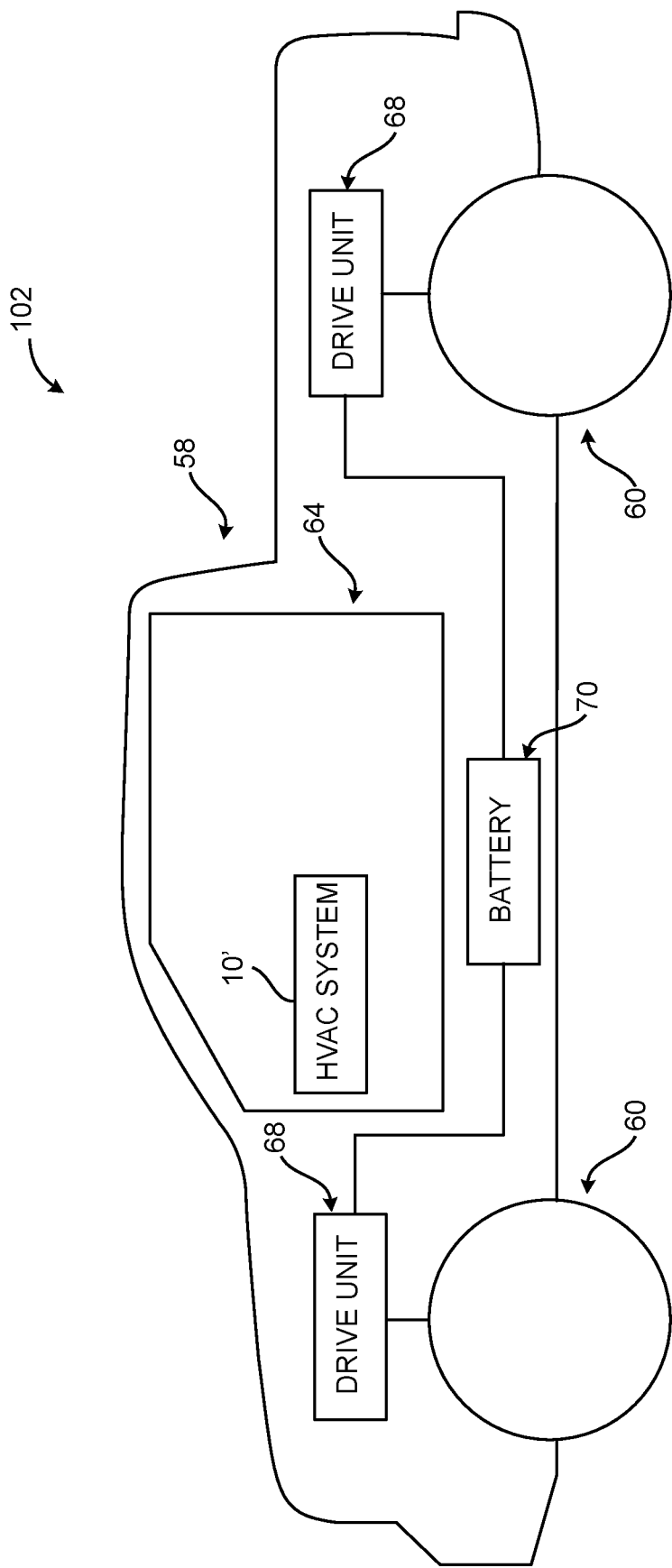
FIG. 2F is a block diagram in partial schematic form of an illustrative vehicle with the HVAC case of FIG. 2A.

In various embodiments and referring additionally to FIG. 2F, an illustrative electric vehicle 102 may include an HVAC system (such as that provided by the HVAC case 10' and its associated refrigeration circuit 94). In various embodiments the vehicle 102 includes the frame 58, the rotatable wheels 60, at least one drive unit 68 electrically couplable to a battery 70 (each drive unit 68 including at least one electric motor) configured to rotate the wheels 60, and the cabin 64. The vehicle 102 includes a heating, ventilation, and air conditioning (HVAC) system as described above. In various embodiments, the HVAC system is provided as the HVAC case 10' that includes the case 12' at least partially disposed in the cabin 64, the blower 36 disposed in the case 12' and configured to cause air to flow, the heat exchanger 38 disposed in the case 12' and configured to heat the air, and the ambient extractor port 90 disposed within the case 12' and configured to discharge from the case 12' to an ambient environment exterior to the cabin 64 the air provided to the ambient extractor port 90.

In various embodiments the vehicle 102 includes the refrigeration circuit 94, including the external heat exchanger 96 and the external heat exchanger 98 as discussed above.

In various embodiments, the HVAC case 10' is configured to be disposed in a manner chosen from disposed entirely in the cabin 64 of the vehicle 102 and disposed partially in the cabin 64 of the vehicle 102 and partially exterior to the cabin 64 of the vehicle 102. For example, in some embodiments the heat exchanger 38 and the heating element 44 may be disposed in the cabin 64 and the blower 36 may be disposed exterior to the cabin 64. It will be appreciated that such a mounting scheme saves space inside the cabin 64. It will also be appreciated that locating the blower 36 outside the cabin can help reduce noise, vibration, and harshness (NVH) issues, thereby helping to contribute to a quieter and smoother experience for an occupant.

Figure 2G:
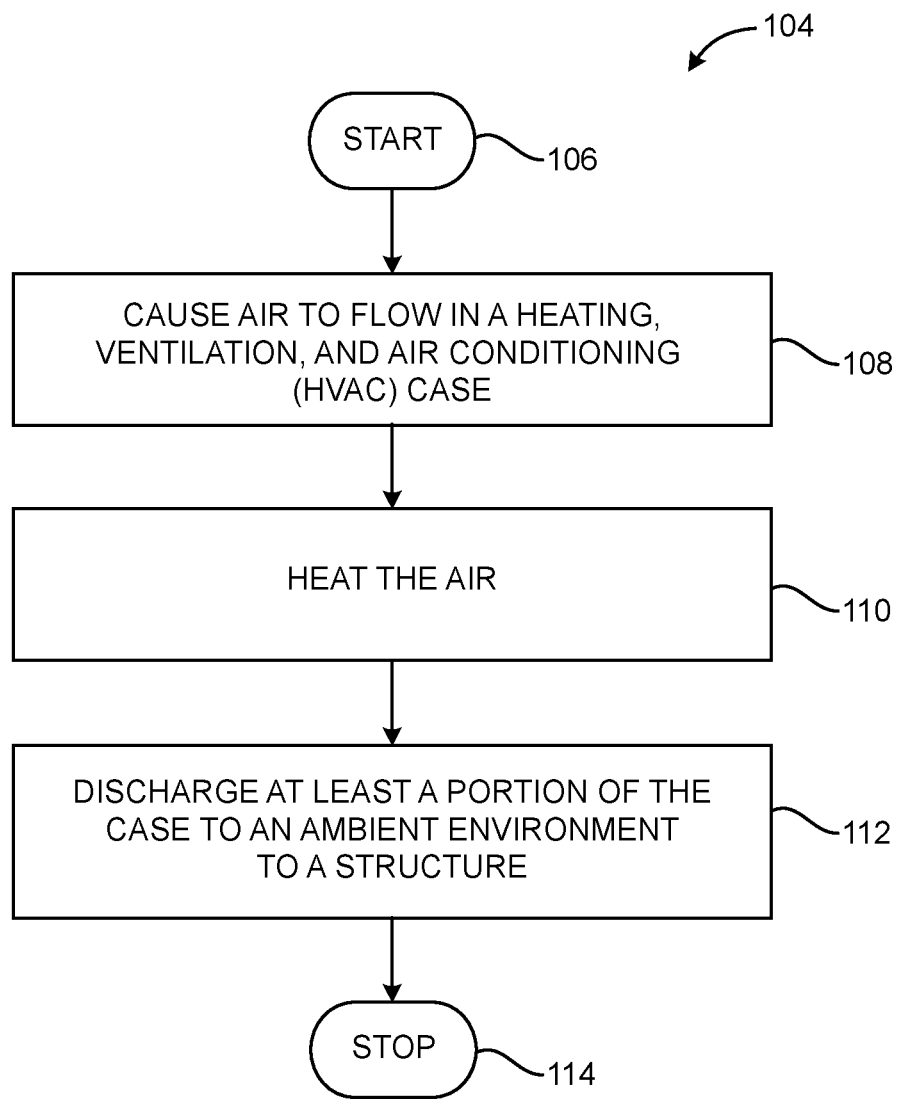
FIG. 2G is a flowchart of a method for discharging air from an HVAC case to an ambient environment.

Referring additionally to FIG. 2G, in various embodiments a method 104 is provided for discharging air from an HVAC case to an ambient environment exterior to a structure. The method begins at a block 106. At a block 108 air is caused to flow in a heating, ventilation, and air conditioning (HVAC) case. At a block 110 the air is heated. At a block 112 at least a portion of the air is discharged from the case to an ambient environment exterior to a structure. The method 104 ends at a block 114.

In various embodiments air may be prevented from being discharged from the case to the ambient environment exterior to the structure.

In various embodiments heating the air may include heating the air with a first heat exchanger disposed in the case and configured to heat the air.

In various embodiments heating the air with a first heat exchanger disposed in the case and configured to heat the air may include exchanging heat between the air and refrigerant in a first heat exchanger disposed in the case and configured to heat the air.

In various embodiments, refrigerant may be provided from the first heat exchanger disposed in the case to a second heat exchanger disposed exterior to the structure and configured to exchange heat with ambient air exterior to the structure. It will be appreciated that various examples of exchanging heat as disclosed herein are provided by way of illustration only and not of limitation and should not be interpreted to be limiting. For example, various exchanges of heat may involve providing heat to and/or removing heat from various airflows or other fluid flows.

In various embodiments a heat source disposed exterior to the structure may be cooled with a third heat exchanger disposed exterior to the structure.

In various embodiments cooling a heat source disposed exterior to the structure with a third heat exchanger disposed exterior to the structure may include expanding refrigerant from the second heat exchanger, exchanging heat between the expanded refrigerant and fluid exterior to the structure to cool the fluid, and exchanging heat between the heat source and the cooled fluid.

In various embodiments expanded refrigerant may be provided from the third heat exchanger to a compressor and the expanded refrigerant may be compressed. In various embodiments compressed refrigerant may be provided to the first heat exchanger.

In various embodiments heating the air may include heating the air with a heating device.

Figure 3A:
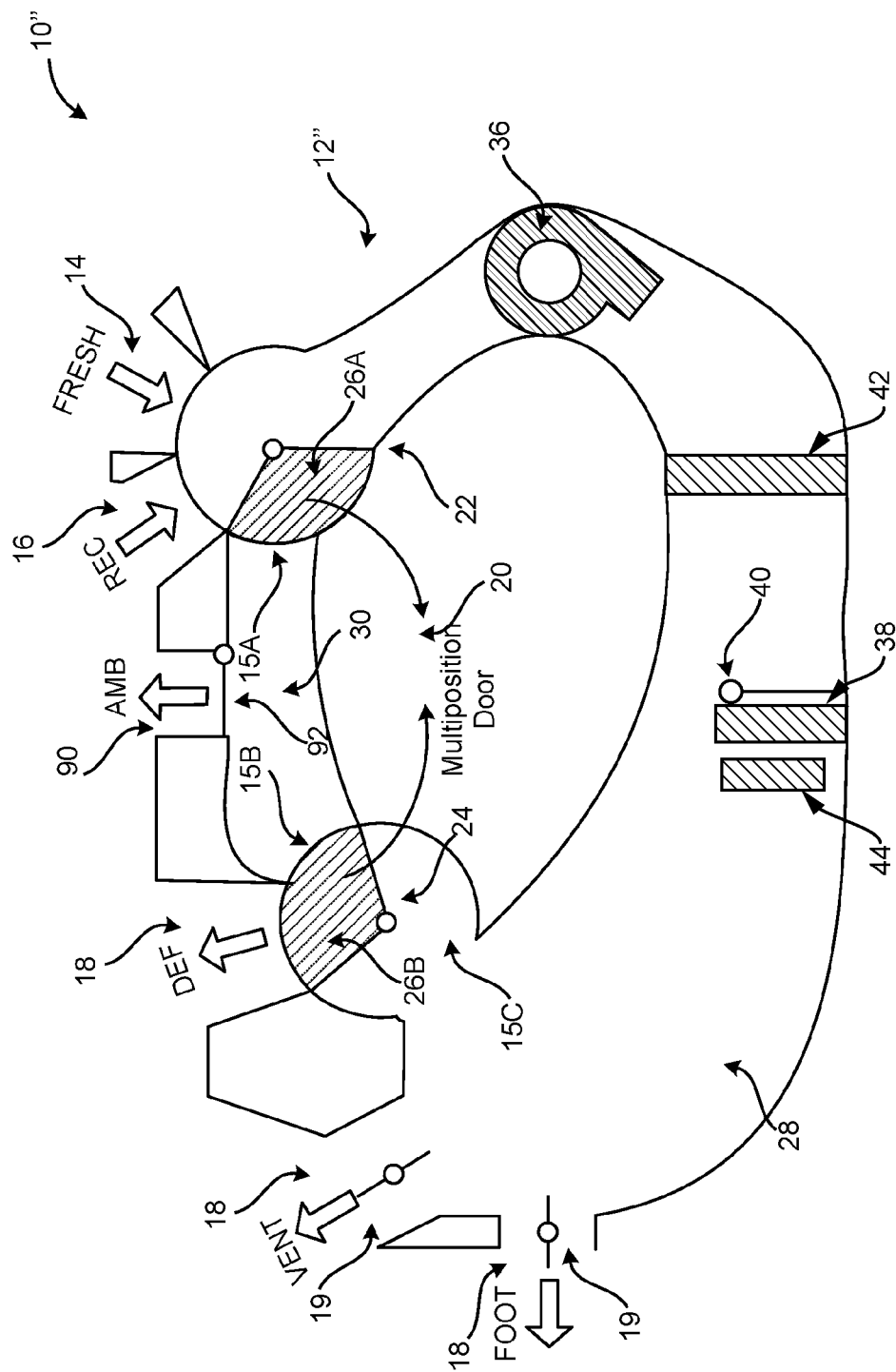
FIG. 3A is a schematic illustration of an illustrative HVAC case with a multi-position door for case recirculation and an ambient extractor port.
Figure 3B:
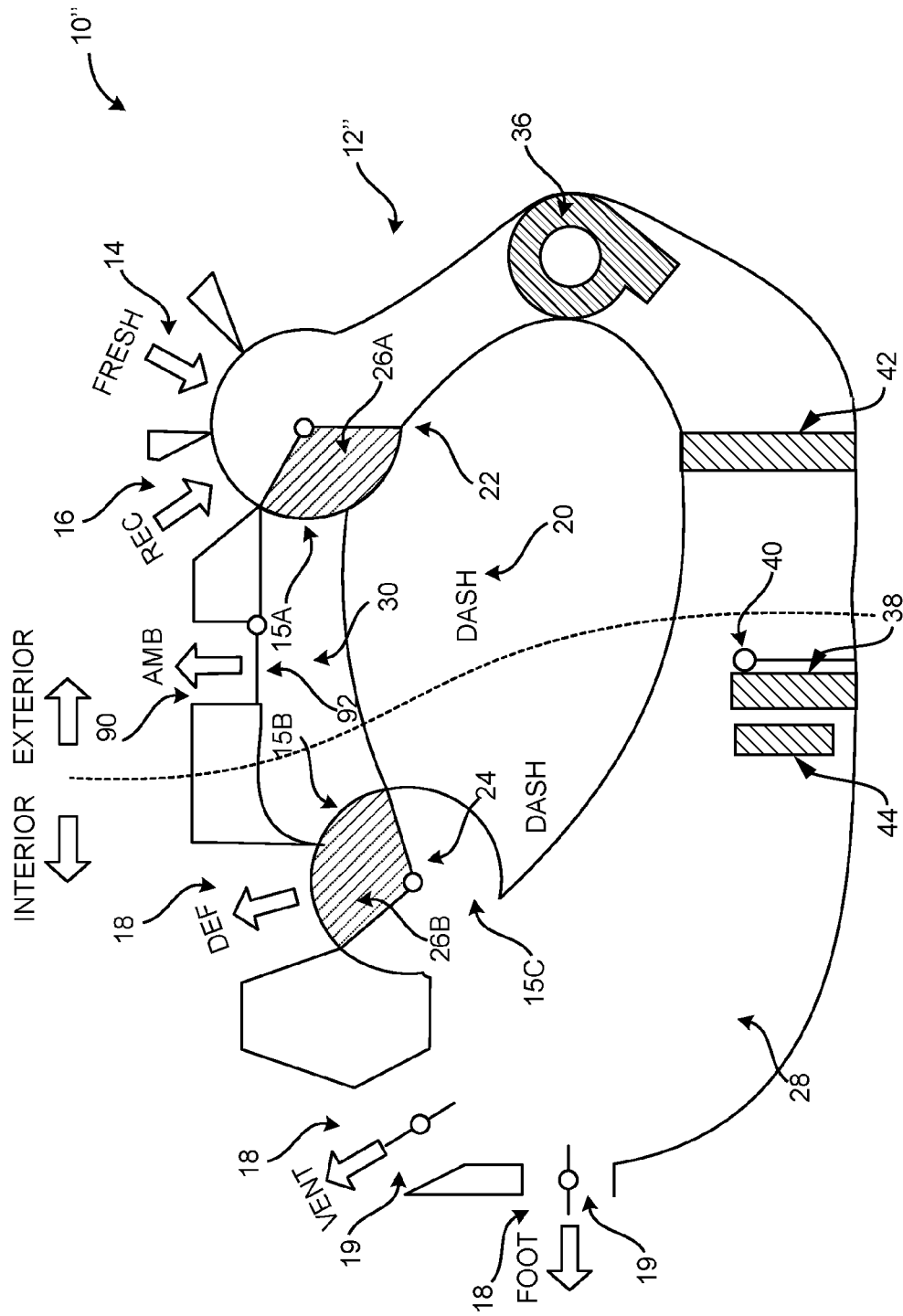
FIG. 3B is a schematic illustration of the HVAC case of FIG. 3A installable partly within an interior of a structure and partly exterior to the structure.

In various embodiments and referring additionally to FIGS. 3A and 3B, an illustrative HVAC case 10" may include the multi-position air door 20 for case recirculation and the ambient extractor port 90.

In such embodiments, the HVAC case 10" includes a case 12", the ambient inlet port 14, the recirculation inlet port 16, at least one discharge port 18, the multi-position air door 20 including the inlet port door section 22 and the outlet port door section 24, and the ambient extractor port 90.

In such embodiments, the HVAC case 10" is configurable for use as an HVAC system with either the refrigerant circuit 46 (FIG. 1E) for case recirculation or the refrigerant circuit 94 (FIG. 2D) for maximum external heat load cooling as discussed above.

In various embodiments the HVAC case 10" may be configured to be disposed entirely in a structure or disposed partially in the structure and partially exterior to the structure in the same manner as the HVAC case 10 (FIG. 1D) or the HVAC case 10' (FIG. 2C).

Figure 3C:
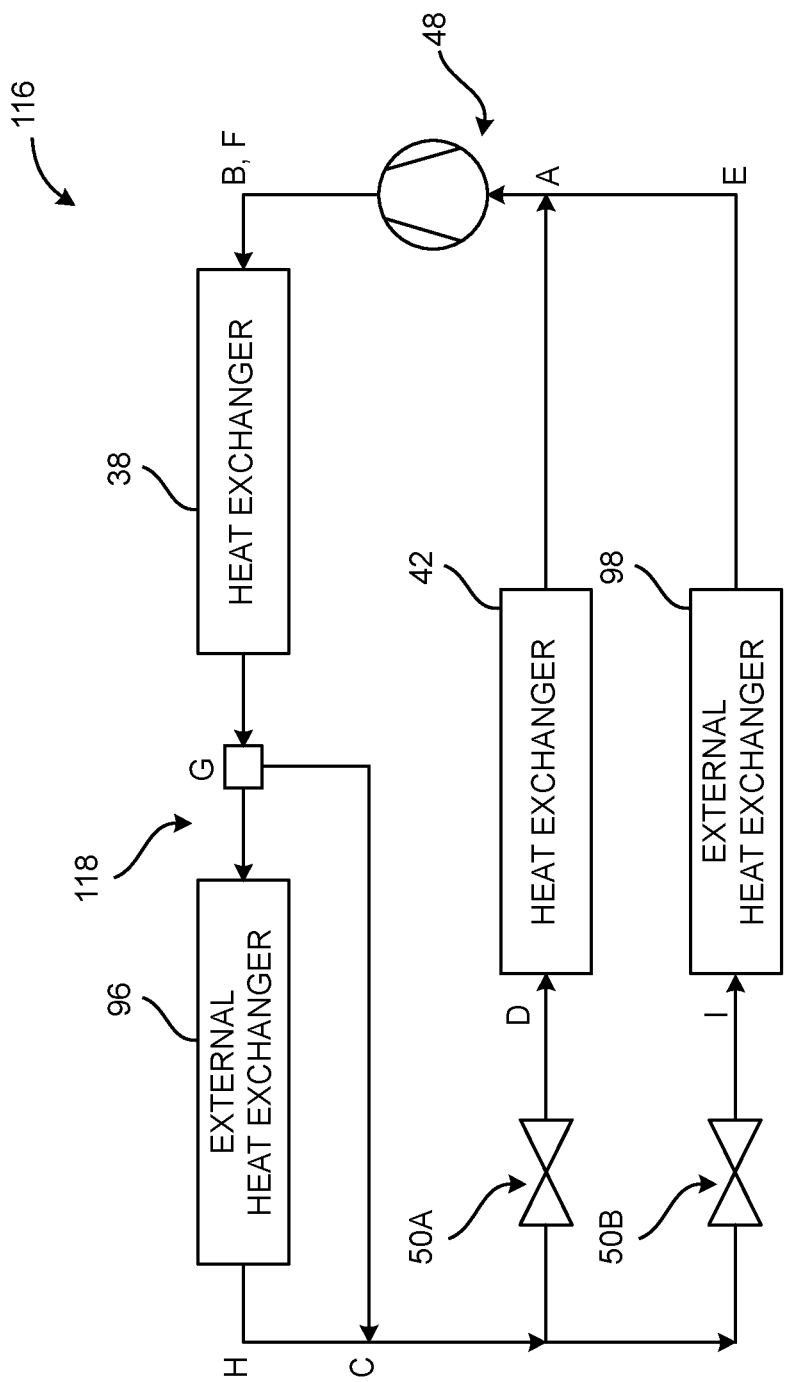
FIG. 3C is a block diagram in partial schematic form of a heat pump system suitable for use with the HVAC cases of FIGS. 1A, 2A, and/or 3A.

In various embodiments and referring additionally to FIG. 3C, given by way of non-limiting example an illustrative reconfigurable refrigerant circuit 116 may be configured as either the refrigerant circuit 46 (FIG. 1E) for case recirculation or the refrigerant circuit 94 (FIG. 2D) for maximum external heat load cooling. As such, the reconfigurable refrigerant circuit 116 may be used with the HVAC case 10 (FIG. 1D), the HVAC case 10' (FIG. 2C), or the HVAC case 10" (FIG. 3B).

In various embodiments a discharge outlet of the compressor is fluidly coupled to an inlet of the heat exchanger 38. An outlet of the heat exchanger 38 is fluidly coupled to an inlet of a flow selector valve 118. One outlet of the flow selector valve 118 is fluidly coupled to an inlet of the expansion device 50A for the heat exchanger 42 and the expansion device 50B for the external heat exchanger 98. Another outlet of the flow selector valve 118 is fluidly coupled to an inlet of the external heat exchanger 96. An outlet of the external heat exchanger 96 is also fluidly coupled to an inlet of the expansion device 50A for the heat exchanger 42 and the expansion device 50B for the external heat exchanger 98. An outlet of the expansion device 50A is fluidly coupled to an inlet of the heat exchanger 42. An outlet of the heat exchanger 42 is fluidly coupled to a suction inlet of the compressor 48. An outlet of the expansion device 50B is fluidly coupled to an inlet of the external heat exchanger 98. An outlet of the external heat exchanger 98 is also fluidly coupled to a suction inlet of the compressor 48.

Figure 3D:
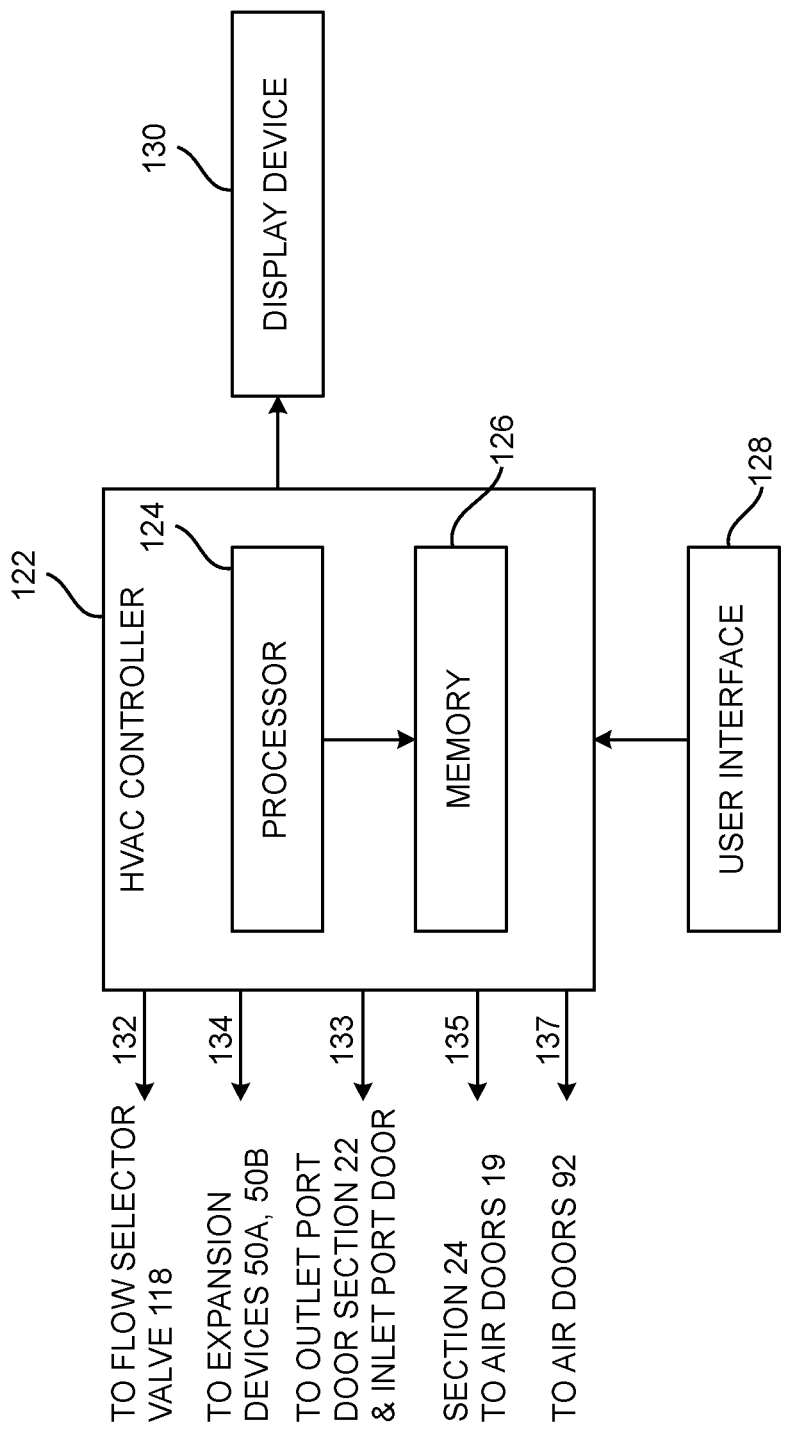
FIG. 3D is a block diagram of an illustrative HVAC controller.

Referring additionally to FIG. 3D, in various embodiments the flow selector valves 118 and the expansion devices 50A and 50B may receive respective control signals from any suitable source of control signals, such as for example an illustrative HVAC controller 122. It will also be appreciated that the outlet port door section 22, the inlet port door section 24, the air doors 19, and the air door 92 also may receive respective control signals from any suitable source of control signals, such as for example the illustrative HVAC controller 122. Accordingly, it will be appreciated that the HVAC controller 122 may be used with the HVAC case 10 (FIG. 1D), the HVAC case 10' (FIG. 2C), or the HVAC case 10" (FIG. 3B).

In various embodiments the HVAC controller 122 includes a processor 124 and computer-readable media (memory) 126 that includes computer-executable instructions that cause the processor 124 to perform functions described herein. The processor 124 may be any suitable processor as desired, such as a computer processor, a field-programmable gate array (FPGA), or the like. The memory may be any suitable computer memory as desired, such as volatile memory or non-volatile memory. Processors and memory are well known and no further discussion of their construction and operation are necessary for an understanding of disclosed subject matter.

A user interface 128 and a display device 130 are electrically coupled to the HVAC controller 122. The user interface 128 may be any suitable user interface as desired and the display device 130 may be any suitable display device as desired. In some embodiments the display device 130 may be a touch-screen display. In such embodiments the user interface 128 is incorporated with the display device 130. User interfaces and display devices are well known and no further discussion of their construction and operation are necessary for an understanding of disclosed subject matter.

Given by way of non-limiting example, a user may select via the user interface 128 an HVAC mode for rapid cabin heating. In response thereto, the processor 124 is caused to generate a control signal 132 for the flow selector valve 118 and a control signal 134 for the expansion devices 50A and 50B. The control signal 132 causes the flow control valve 118 to fluidly couple output of the heat exchanger 38 to bypass the external heat exchanger 96. The control signal 134 causes the expansion device 50B to close and the expansion device 50A to open, thereby allowing all refrigerant to flow into the heat exchanger 42. The processor 124 is also caused to generate a control signal 133 for the outlet port door section 22 and the inlet port door section 24 and a control signal 135 for the air doors 19. In response to the control signals 133 and 135 the outlet port door section 22 and the inlet port door section 24 and the air doors 19 are positioned as described above to effect recirculation as desired within the case 12.

Given by way of another non-limiting example, a user may select via the user interface 128 an HVAC mode for maximum battery cooling. In response thereto, the processor 124 is caused to generate the control signal 132 for the flow selector valve 118 and the control signal 134 for the expansion devices 50A and 50B. The control signal 132 causes the flow control valve 118 to fluidly couple output of the heat exchanger 38 to the inlet of the external heat exchanger 96. The control signal 134 causes the expansion device 50A to close and the expansion device 50B to open, allowing all refrigerant to flow into the external heat exchanger 98. The processor 124 is also caused to generate the control signal 135 for the air doors 19 and a control signal 137 for the air door 92. In response to the control signals 135 and 137 the air doors 19 and the air door 92 are positioned as described above to effect maximum battery cooling.

Figure 3E:
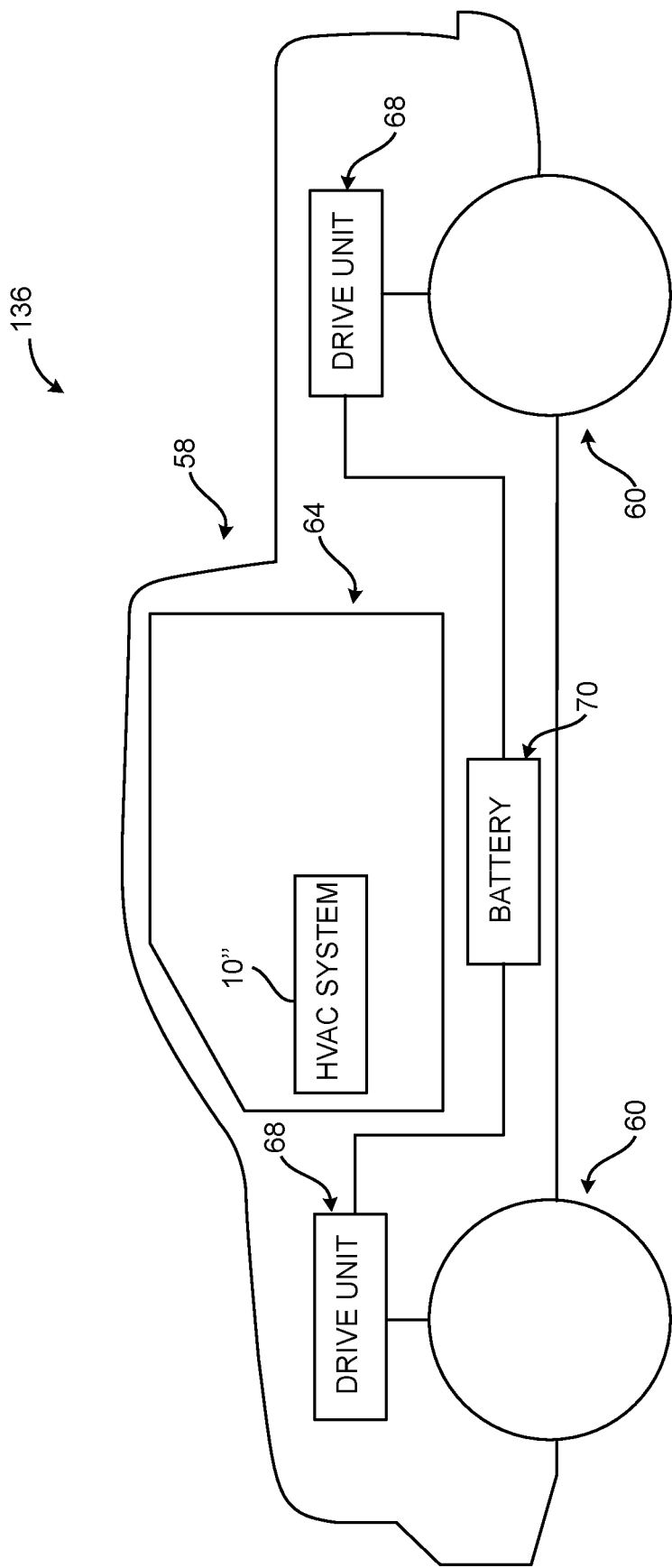
FIG. 3E is a block diagram in partial schematic form of an illustrative vehicle with the HVAC case of FIG. 3A.

Referring additionally to FIG. 3E, in various embodiments an illustrative electric vehicle 136 may include an HVAC system (such as that provided by the HVAC case 10" and its associated reconfigurable refrigeration circuit 116). In various embodiments the vehicle 136 includes the frame 58, the rotatable wheels 60, at least one drive unit 68 electrically couplable to the battery 70 (each drive unit 68 including at least one electric motor) configured to rotate the wheels 60, and the cabin 64. The vehicle 136 includes a heating, ventilation, and air conditioning (HVAC) system as described above. In various embodiments, the HVAC system is provided as the HVAC case 10" that includes the case 12" at least partially disposed in the cabin 64, the blower 36 disposed in the case 12" and configured to cause air to flow, the heat exchanger 38 disposed in the case 12" and configured to heat the air, and the ambient extractor port 90 disposed within the case 12" and configured to discharge from the case 12" to an ambient environment exterior to the cabin 64 the air provided to the ambient extractor port 90.

In various embodiments the vehicle 136 includes the reconfigurable refrigeration circuit 116, including the external heat exchanger 96 and the external heat exchanger 98 as discussed above.

In various embodiments, the HVAC case 10″ is configured to be disposed in a manner chosen from disposed entirely in the cabin 64 of the vehicle 136 and disposed partially in the cabin 64 of the vehicle 136 and partially exterior to the cabin 64 of the vehicle 136. For example, in some embodiments the heat exchanger 38 and the heating element 44 may be disposed in the cabin 64 and the blower 36 may be disposed exterior to the cabin 64. It will be appreciated that such a mounting scheme saves space inside the cabin 64. It will also be appreciated that locating the blower 36 outside the cabin can help reduce noise, vibration, and harshness (NVH) issues, thereby helping to contribute to a quieter and smoother experience for an occupant.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A heating, ventilation, and air conditioning (HVAC) system comprising:
   a case comprising an interior portion disposed inside a cabin of a vehicle and an exterior portion disposed outside the cabin of the vehicle;
   a blower disposed in the case and configured to cause air to flow;
   a first heat exchanger disposed in the interior portion of the case and configured to heat the air;
   an ambient extractor port defined in the case and configured to discharge air from the case to an ambient environment outside the cabin of the vehicle; and
   a refrigerant circuit, including:
      a second heat exchanger disposed in the exterior portion of the case, the second heat exchanger configured to receive fluid from the first heat exchanger and exchange heat between the fluid and the ambient environment, wherein the second heat exchanger is configured to provide the fluid to an expansion device; and
      a third heat exchanger disposed in the exterior portion of the case configured to:
         receive expanded fluid from the expansion device;
         exchange heat between the expanded fluid and a second fluid disposed outside the cabin of the vehicle; and
         provide the expanded fluid to a compressor.

2. The HVAC system of claim 1, wherein the ambient extractor port includes an air door repositionable between a first position configured to permit discharge of the air from the case to the ambient environment and a second position configured to prevent discharge of the air from the case to the ambient environment.

3. The HVAC system of claim 1, the refrigerant circuit including:

the compressor coupled to receive the expanded fluid from the third heat exchanger and configured to compress the expanded fluid and provide compressed fluid to the first heat exchanger.

4. The HVAC system of claim 1, wherein the chiller is configured to provide the coolant fluid for cooling a battery of the vehicle.

* * * * *